US011886601B2

(12) United States Patent
Goldstone et al.

(10) Patent No.: US 11,886,601 B2
(45) Date of Patent: Jan. 30, 2024

(54) SECURE DATA LEAKAGE CONTROL IN A THIRD PARTY CLOUD COMPUTING ENVIRONMENT

(71) Applicant: Barclays Execution Services Limited, London (GB)

(72) Inventors: Jeremy Goldstone, London (GB); Joe O'Brien, London (GB); Jeeban Panigrahi, London (GB)

(73) Assignee: Barclays Execution Services Limited, London (GB)

( * ) Notice: Subject to any disclaimer, the term of this patent is extended or adjusted under 35 U.S.C. 154(b) by 327 days.

(21) Appl. No.: 17/127,245

(22) Filed: Dec. 18, 2020

(65) Prior Publication Data

US 2021/0192063 A1 Jun. 24, 2021

(30) Foreign Application Priority Data

Dec. 20, 2019 (EP) .................................... 19219099

(51) Int. Cl.
*G06F 21/62* (2013.01)
*G06F 16/903* (2019.01)
*H04L 9/40* (2022.01)
*G06F 9/451* (2018.01)
*G06F 9/54* (2006.01)

(52) U.S. Cl.
CPC ........ *G06F 21/62* (2013.01); *G06F 16/90335* (2019.01); *H04L 63/08* (2013.01); *H04L 63/101* (2013.01); *G06F 9/451* (2018.02); *G06F 9/541* (2013.01); *G06F 2221/2115* (2013.01); *H04L 2463/082* (2013.01)

(58) Field of Classification Search
CPC .... G06F 21/62; G06F 16/90335; G06F 9/451; G06F 9/541; G06F 2221/2115; H04L 63/08; H04L 63/101; H04L 2463/082
USPC .......................................................... 726/30
See application file for complete search history.

(56) References Cited

U.S. PATENT DOCUMENTS

| | | | |
|---|---|---|---|
| 9,600,676 B1 * | 3/2017 | Farmer | H04L 9/3271 |
| 10,412,097 B1 * | 9/2019 | Banshats | H04L 63/083 |
| 10,742,619 B1 * | 8/2020 | Haigh | G06F 11/2097 |

(Continued)

OTHER PUBLICATIONS

Subashini, "A survey on security issues in service delivery models of cloud computing", 2011, Journal of Network and Computer Applications, pp. 1-11 (Year: 2011).*

(Continued)

*Primary Examiner* — Noura Zoubair
*Assistant Examiner* — Gregory A Lane
(74) *Attorney, Agent, or Firm* — Wilmer Cutler Pickering Hale and Dorr LLP

(57) ABSTRACT

A method of securely processing data in a third party cloud environment is provided. Third party computer executable code is executed in a secure portion of the third party cloud environment. An external data request for external data to be received from an external data provider is then processed whereby the external data request comprises at least a portion of the secure data. The third party cloud environment determines whether to authorise the first external data request, and if the request is so authorised the request is sent to the external data provider and the external data is received from the external data provider.

29 Claims, 7 Drawing Sheets

(56) References Cited

U.S. PATENT DOCUMENTS

| | | | |
|---|---|---|---|
| 2003/0041250 A1* | 2/2003 | Proudler | G06F 21/575 713/182 |
| 2005/0278542 A1* | 12/2005 | Pierson | H04L 63/0876 713/182 |
| 2010/0291898 A1* | 11/2010 | Sanding | H04W 8/183 455/418 |
| 2011/0219229 A1* | 9/2011 | Cholas | H04L 63/08 713/168 |
| 2011/0276939 A1* | 11/2011 | Frankin | G06F 8/71 717/101 |
| 2012/0295664 A1* | 11/2012 | Walker | H04L 67/561 455/561 |
| 2013/0276144 A1* | 10/2013 | Hansen | H04L 63/08 726/29 |
| 2013/0318593 A1* | 11/2013 | Smith | G06F 16/907 709/225 |
| 2014/0026181 A1 | 1/2014 | Kiang et al. | |
| 2014/0068262 A1* | 3/2014 | Robertson | H04L 63/0428 713/168 |
| 2014/0137265 A1* | 5/2014 | Dubman | G06F 21/6227 726/27 |
| 2015/0193465 A1* | 7/2015 | Schoeffler | H04L 63/083 707/827 |
| 2015/0317490 A1 | 11/2015 | Carey et al. | |
| 2016/0224358 A1* | 8/2016 | Subramanian | G06F 9/452 |
| 2017/0244729 A1* | 8/2017 | Fahrny | H04L 63/0823 |
| 2017/0315744 A1* | 11/2017 | Kurian | G06F 21/62 |
| 2018/0288051 A1 | 10/2018 | Hockings et al. | |
| 2019/0087278 A1* | 3/2019 | Almog | G06F 21/6227 |
| 2020/0151348 A1* | 5/2020 | Chauhan | H04L 67/53 |
| 2020/0202030 A1* | 6/2020 | Pacella | G06F 7/582 |
| 2020/0274861 A1* | 8/2020 | Black | G06N 5/046 |
| 2021/0056184 A1* | 2/2021 | Modani | G06F 21/78 |
| 2021/0243194 A1* | 8/2021 | Nelsen | H04L 63/083 |

OTHER PUBLICATIONS

Bater, "SMCQL: Secure Querying for Federated Databases", 2016, arXiv, pp. 1-13 (Year: 2016).*

European Search Report dated May 19, 2020, for European Application No. 19219099.9. 7 pages.

* cited by examiner

SECURE DATA LEAKAGE CONTROL IN A THIRD PARTY CLOUD COMPUTING ENVIRONMENT

TECHNICAL FIELD

The present invention relates to a method of securely processing data in a third-party cloud environment. In particular, the present invention relates to the method, a secure portion for a third-party cloud environment configured to perform the method, and computer hardware configured to implement the method or the secure portion.

BACKGROUND

In cloud computing environments, computer resources, especially data processing and data storage, are delivered in an on-demand fashion to users via a communication network such as the Internet. Typically, cloud environments are provided by a third party who own and maintain the physical hardware underlying the cloud environment. This takes away the burden from the users for provisioning and maintaining their own physical computer hardware. Moreover, as computer resources are delivered via a communication network, the accessibility of the computer resources to the users is high. Further, by providing computer resources for a multitude of users, third-party cloud environments benefit from economies of scale. In combination, these factors make third-party cloud environments particularly adept for processing and storing large quantities of data, and convenient when more than two parties are involved. This has contributed to an acceleration in use of third-party cloud environments over the past decade. Examples of third-party cloud environments include Amazon Web Services (AWS), Microsoft Azure, Google Cloud Platform, and IMB Cloud.

Third-party cloud environments suffer from poor security provisions. Although third-party cloud environments do offer basic security provisions, particularly in view of the multitude of users using the cloud environment, such cloud environments are not currently suitable in certain use cases, particularly use cases in which protected data or protected computer executable code is involved. An example of a use case in which third-party cloud environments are not currently suitable is the execution of computer executable code which, when executed, processes protected data. A further example is the execution of protected computer executable code.

SUMMARY

In a first aspect of the invention, there is provided a method of securely processing data in a third party cloud environment, the method comprising:
  providing in a secure portion of the third party cloud environment which is under the control of a secure data provider, third party computer executable code from a third party user;
  executing the third party computer executable code in the secure portion to request and receive from a secure data provider secure data of the secure data provider;
  processing in a secure portion of the third party cloud environment, an external data request for external data to be received from an external data provider, the external data request comprising at least a portion of the secure data; and
  determining by the third party cloud environment whether to authorise the external data request, and if the request is so authorised sending the request to the external data provider and receiving the external data from the external data provider.

The aforementioned method thus protects against certain secure data, which have to be protected by the secure data provider, being obtained by malicious parties, for example by malicious executable code being executed, perhaps unknowingly, in the third party cloud computing environment. Moreover, or in addition, the secure data can be protected from being passed in external data requests to external data providers which are not trusted or which may be under the control or accessible to malicious parties.

The method may further comprise executing, in the secure portion of the third party cloud environment, the computer executable code which is configured to generate an output dataset by processing some or all of the received secure data and/or the received external data.

The method may further comprise:
  determining by the third party cloud environment, whether the output dataset is authorised for retrieval from the secured portion of the third party cloud environment; and
  if the output dataset is not authorised for retrieval, then preventing the output dataset from being retrieved from the third party cloud environment.
  the step of determining whether the output dataset is authorised for retrieval comprises determining whether the output dataset is authorised for retrieval by a further third party user.
  If the output dataset is authorised for retrieval, then the method may further comprise outputting the output dataset to a further third party user.

The step of determining whether to authorise the external data request may be performed by a security gateway provisioned by the secure data provider within the secure portion of the third party cloud environment. The secure gateway may be logically located at the edge of the secure gateway such that all external data requests and responses thereto are processed by the secure gateway in the manner outline herein.

The step of determining whether to authorise the external data request may comprise:
  validating whether the portion of the secure data is trusted by the secure data provider for sending to the external data provider;
  if the portion of the secure data is trusted by the secure data provider for sending to the external data provider, sending the external data request to the external data provider for retrieving from the external data provider into the secure portion the external data identified at least in part by the portion of the secure data, and storing, in the secure portion of the third party cloud environment, the received external data;
  if the portion of the secure data is not trusted by the secure data provider, preventing the external data from being retrieved from the external data provider into the third party cloud environment.

The step of validating whether the portion of the secure data is trusted by the secure data provider for sending to the external data provider may comprise:
  accessing a database located within the secure portion or located at the secure data provider comprising an authorised list of secure data types permitted for sending to the external data provider;
  searching the database to determine whether the portion of the secure data is in the list of secure data types for the external data provider;

only if the portion of the secure data is in the list of secure data types, setting the external data provider as trusted.

The step of determining whether to authorise the external data may comprise:
  validating whether the external data provider is trusted by the secure data provider;
  if the external data provider is trusted by the secure data provider, sending the external data request to the external data provider for retrieving from the external data provider into the secure portion the external data, and storing, in the secure portion of the third party cloud environment, the received external data;
  if the external data provider is not trusted by the secure data provider, then preventing the external data from being retrieved from the external data provider into the third party cloud environment.

The step of validating whether the external data provider is trusted by the secure data provider may comprise:
  accessing a database comprising a list of trusted external data providers;
  searching the database to determine whether the external data provider is in the list of trusted external data providers;
  only if the external data provider is in the list of trusted external data providers, then setting the external data provider as trusted.

The following steps can be performed by a security gateway of third party cloud environment: determining whether the received external data is authorised for reception into the secure portion, providing the received external data into the secure portion; and preventing the received external data being received into the secure portion.

The step of determining whether the received external data is authorised for reception into the secure portion of the third party cloud environment may comprise:
  accessing a database located within the secure portion or located at the secure data provider comprising an authorised list of data types and/or data content permitted for receiving into the secure portion;
  searching the database to determine whether the received external data comprises data which is of a data type or comprises content which is in the authorised list;
  only if the data type or content is in the authorised list, setting the received external data as authorised.

Providing the computer executable code in the secure portion may comprise storing the computer executable code within an experimental build account of the secure portion.

The stored computer executable code may be accessible only to the user via a first virtual desktop.

The step of executing may comprise modifying the computer executable code itself within the secure portion, and wherein the step of restricting the user from retrieving the computer executable code from the secure portion comprises preventing the user from obtaining the modified computer executable code.

The step of modifying may be performed by the user within an experimental build account of the secure portion.

Preventing the user from obtaining the modified computer executable code may comprise disabling access to a communication network from the experimental build account.

The step of modifying may be performed by the user in a pipeline of the secure portion.

The pipeline may have a plurality of accounts, and the step of modifying is then performed in at least one of the accounts.

Preventing the user from obtaining the modified computer executable code may comprise disabling access to a communication network from the at least one of the accounts in which the step of modifying is performed.

The secure data may comprise protected data. The secure data may be sensitive or confidential. The secure data may comprise one or more of: a name of a customer of the secure data provider, an account number or details of the secure data provider, and a postal address of a customer of the secure data provider.

The step of providing protected data may comprise receiving at the secure provider a request for protected data from the computer executable code in the secure portion of the third-party cloud environment.

The request for protected data may be a request to access an API of secure provider.

Storing the secure data within the secure portion may comprise storing it within an experimental build account of the secure portion.

The step of executing may comprise processing the secure data and/or external data within a pipeline of the secure portion.

In a second aspect of the present invention, there is provided a secure portion processing module for a cloud computing environment system, wherein the secure portion processing module is configured to perform any one of the aforementioned methods.

In a third aspect of the present invention, there is provided a cloud computing environment system comprising the secure portion processing module.

In a fourth aspect of the present invention, there is provided computer hardware configured to implement: any one of the aforementioned methods, the aforementioned secure portion processing module, or the aforementioned cloud computing environment system.

BRIEF DESCRIPTION OF THE DRAWINGS

Embodiments of the invention are described below, by way of example, with reference to the following drawings, in which.

DETAILED DESCRIPTION

Figure 1:
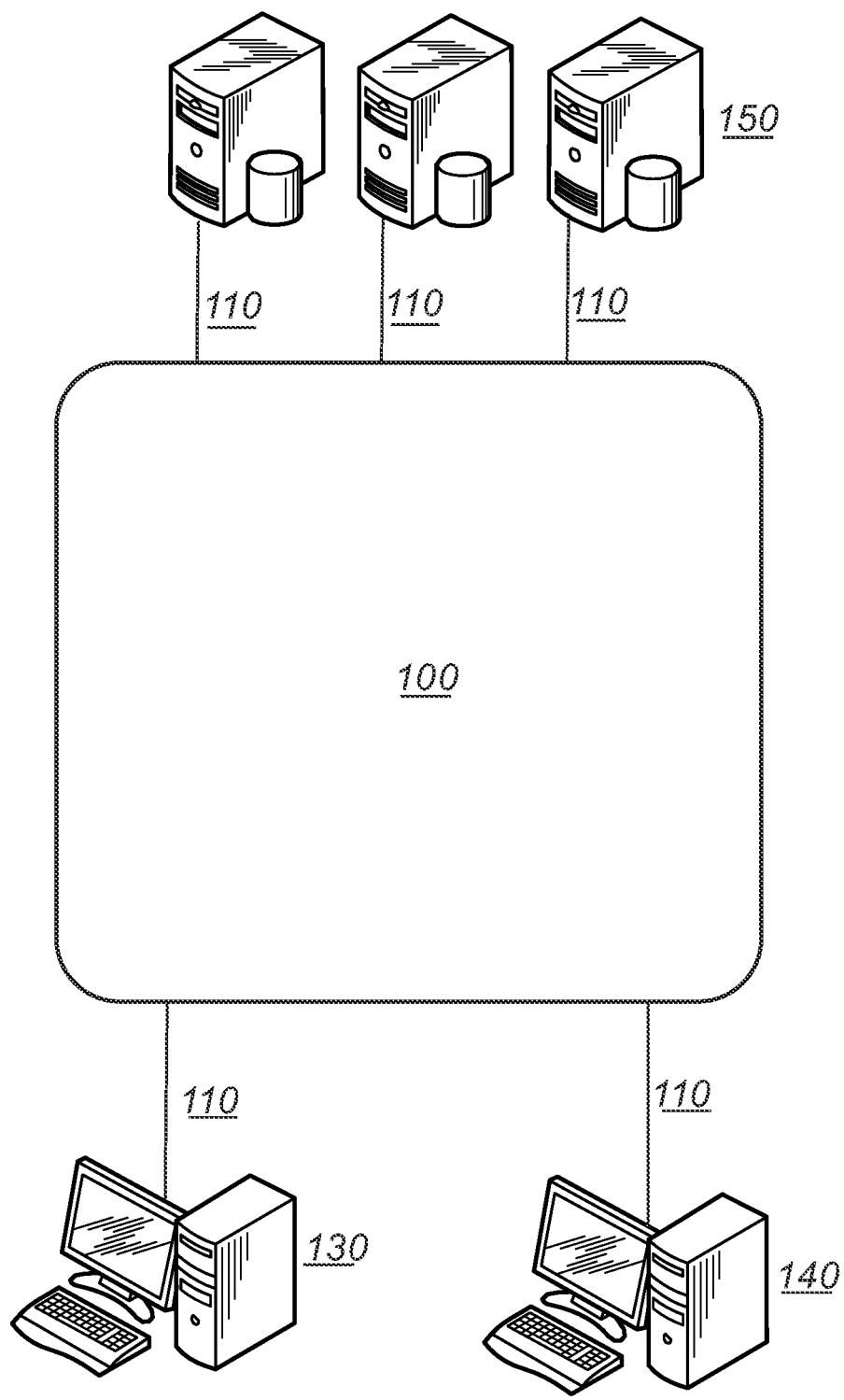
FIG. 1 is a schematic of an exemplary system for implementing a method of the invention.

FIG. 1 is a schematic illustrating an exemplary system for implementing a method of the invention. As shown in FIG. 1, cloud environment 100 is communicatively coupled via communication network 110 to secure provider 130, one or more users 140, and one or more external providers 150. In some embodiments, communication network 110 may be implemented or facilitated using one or more local or wide-area communications networks, such as the Internet, WiFi networks, WiMax networks, and the like. Generally, the Internet is used. Preferably, communication network 110 may utilise encryption (e.g., Secure Sockets Layer) to secure data being transferred over the communication network 110 to the cloud environment 100.

Cloud environment 100 is owned and maintained by a third party, i.e. a party that is not the secure provider 130, not one of the one or more users 140, and not one of the external providers 150. Accordingly, cloud environment 100 may be referred to as "a third-party cloud environment". Examples of third-party cloud environments include Amazon Web Services (AWS), Microsoft Azure, Google Cloud Platform, and IMB Cloud. By connecting to a multitude of users 140, cloud environment 100 is able to benefit from economies of scale, thereby making processing and storing large quantities of data in cloud environment 100 efficient.

Typically, cloud environment 100 hosts computer executable code 324 (not shown) which is executed in the cloud environment 100 in response to a request from user 140. Execution of the computer executable code 324 causes data to be processed, and the output data produced by executing the computer executable code 324 is available for user 140 to access. In this way, the computer resources required for data processing are outsourced from the user to the cloud environment 100. This is advantageous because it means that user 140 does not have to provision and maintain their own physical computer hardware. Moreover, user 140 can send the request from anywhere, as long as they have connection to cloud environment 100 via communication network 110. Since the communication network 110 is typically the Internet, which is ubiquitous, the accessibility of cloud environment 100 to user 140 is extremely high. This is convenient as user 140 does not have to be physically present at a particular location in order to access cloud environment 100. User 140 of the cloud environment 100 may additionally or alternatively develop computer executable code 324 for execution in the cloud environment 100. User 140 can access computer executable code 324 in cloud environment 100 through a web browser or any other appropriate client application residing on a client computer.

When executed, computer executable code 324 may process data or use data. This data is made available to the cloud environment 100 by including particular services in the computer executable code 324 such as access to REST (Representational State Transfer) APIs (Application Programming Interface) or similar communication protocols. REST APIs work by making HTTP requests to GET, PUT, POST and DELETE data. Thus, when the computer executable code 324 makes a request for data, it may do so by making a HTTP GET request to the data source. Such services (and therefore data) may be provided either internally within the cloud environment 100, or externally by one or more external providers 150.

Secure provider 130 is a special type of user 140 which is not only able to interact with cloud environment 100 in the same way as user 140 (i.e. send requests to cause computer executable code 324 to be executed in the cloud environment 100, and develop computer executable code 324 to be executed in the cloud environment 100), but is also able to provide services (and therefore data) to the cloud environment 100. Accordingly, the secure provider 130 may be thought of as a hybrid user/external provider. Secure provider 130 has additional security provisions over user 140 and external providers 150 because data provided by the secure provider 130 may be protected data and/or the computer executable code developed by the secure provider 130 may be protected. Further discussion of protected data and protected computer executable code is provided below.

Figure 2:
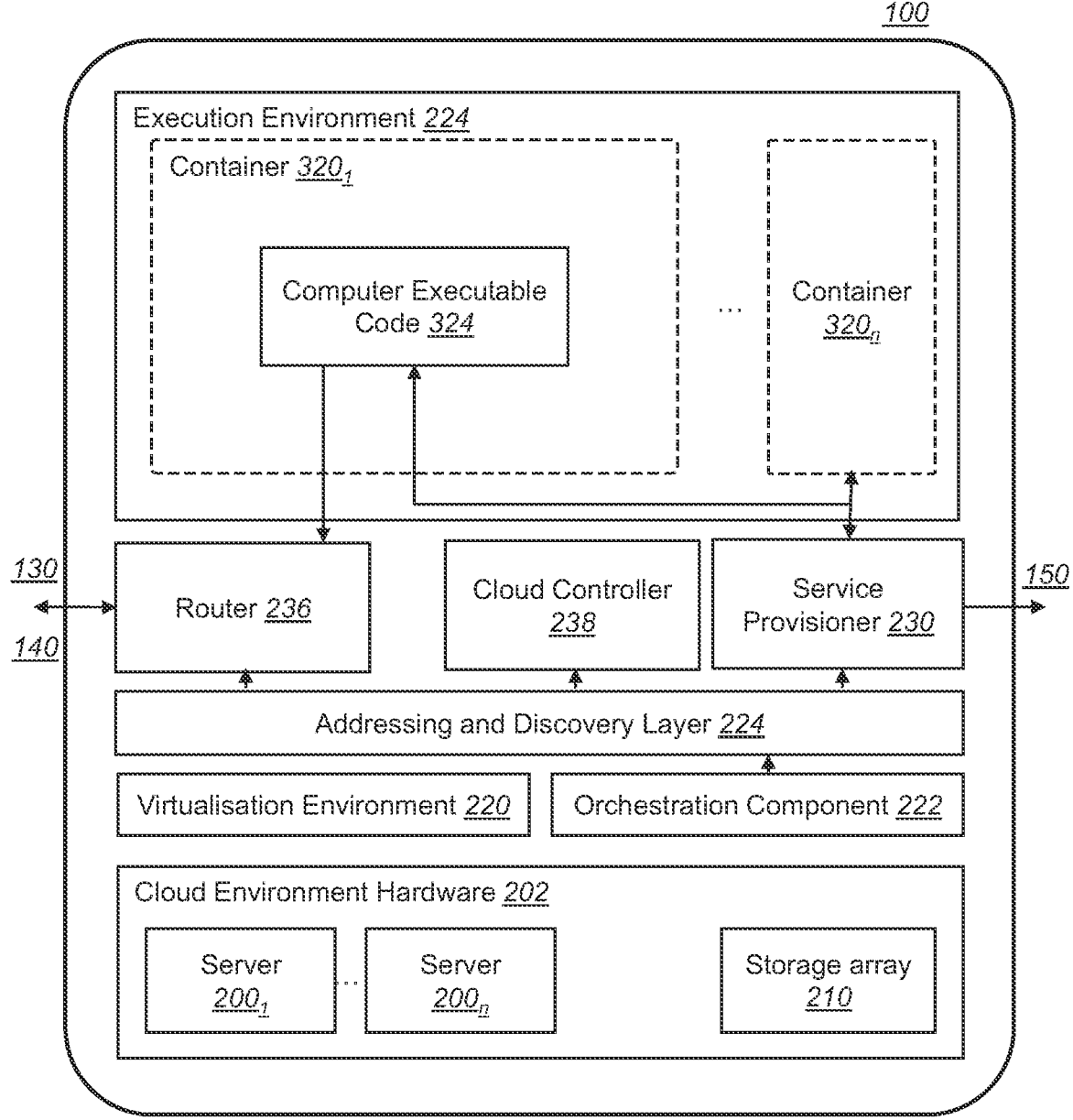
FIG. 2 is a schematic of an exemplary third-party cloud environment for implementing a method of the invention.

FIG. 2 shows an exemplary third-party cloud environment 100 for implementing a method of the invention. As seen in FIG. 2, cloud environment 100 comprises cloud environment hardware 202 that can be invoked to instantiate data processing, data storage, or other computer resources using cloud computing hardware 202 for a limited or defined duration. Cloud environment hardware 202 may comprise one or more servers $200_1$ to $200_n$, and a storage array network 210, as well as any other suitable hardware. Cloud environment hardware 202 may be configured to provide a virtualisation environment 220 that supports the execution of a plurality of virtual machines 310 (not shown) across the one or more servers $200_1$ to $200_n$. As described in relation to FIG. 3, the plurality of virtual machines 310 provide various services and functions for cloud environment 100.

Virtualisation environment 220 of FIG. 2 may include orchestration component 222 that monitors the cloud environment hardware 202 resource consumption levels and the requirements of cloud environment 100 (e.g., by monitoring communications routed through addressing and discovery layer 224), and provides additional cloud environment hardware 202 to cloud environment 100 as needed. For example, if cloud environment 100 requires additional virtual machines 310 to host new computer executable code 324, orchestration component 222 can initiate and manage the instantiation of the virtual machines 310 on the one or more servers $200_1$ to $200_n$ to support such needs. In one example implementation, virtualisation environment 220 may be implemented by running Amazon Elastic Compute Cloud (Amazon EC2) on servers $200_1$ to $200_n$. It should be recognised that any other virtualization technologies, including VMware ESX and Microsoft Hyper V virtualization technologies, may alternatively be utilised.

Cloud environment 100 supports an execution environment 232 that comprises a plurality of virtual machines 310 (or containers 320, as is discussed in relation to FIG. 3) instantiated to host deployed computer executable code 324. For example, deployment by user 140 or by secure provider 130 of computer executable code 324 to the cloud environment 100 results in the hosting of computer executable code 324 in virtual machine $310_1$ and/or container $320_1$, of execution environment 232.

Computer executable code 324 can access internal services provided by cloud environment 100 as well as external services from one or more external providers 150 and/or from secure provider 130. Services may include, for example, accessing a REST API, a custom database, a relational database service (e.g., MySQL, etc.), monitoring service, background task scheduler, logging service, messaging service, memory object caching service and the like. A service provisioner 230 serves as a communications intermediary between these available services (e.g., internal services and external services) and other components of cloud environment 100 (e.g., cloud controller 238, router 236, containers 320) and assists with provisioning available services to computer executable code 324 during the deployment process.

Service provisioner 230 may maintain a stub for each service available in cloud computing environment 100. Each stub itself maintains service provisioning data for its corresponding service, such as a description of the service type, service characteristics, login credentials for the service (e.g., root username, password, etc.), a network address and port number of the service, and the like. Each stub component is configured to communicate with its corresponding service using an API or similar communications protocol.

Referring back to FIG. 2, addressing and discovery layer 224 provides a common interface through which components of cloud computing environment 100, such as service provisioner 230, cloud controller 238, router 236 and containers 320 in the execution environment 232 can communicate. For example, service provisioner 230 may communicate through addressing and discovery layer 224 to broadcast the availability of services and to propagate service provisioning data for such services during deployment of computer executable code 324 in cloud environment 100.

Cloud controller 238 is configured to orchestrate the deployment process for computer executable code 324 that is submitted to cloud environment 100 by the user 140 or the secure provider 130. In particular, cloud controller 238 receives computer executable code 324 submitted to cloud computing environment 100 from user 140 or secure provider 130 and, as further detailed below, interacts with other components of cloud environment 100 to call services required by the computer executable code 324 and package the computer executable code 324 for transmission to available containers 320. An example cloud controller 238 service is Amazon Elastic Container service (ECS).

Typically, once cloud controller 238 successfully orchestrates the computer executable code 324 in container 320, a secure provider 130 and/or a user 140 can access the computer executable code through a web browser or any other appropriate client application residing on a computer of user 140 or service provider 130. Router 236 receives the web browsers access request (e.g., a uniform resource locator or URL) and routes the request to container 310 which hosts the computer executable code 324.

It should be recognized that the embodiment of FIG. 2 is merely exemplary and that alternative cloud environment architectures may be implemented consistent with the teachings herein. For example, while FIG. 2 implements cloud computing environment 100 on cloud environment hardware 202, it should be recognized that cloud environment 100 may be implemented by a third-party in an alternative manner and on top of any type of hardware.

Figure 3:
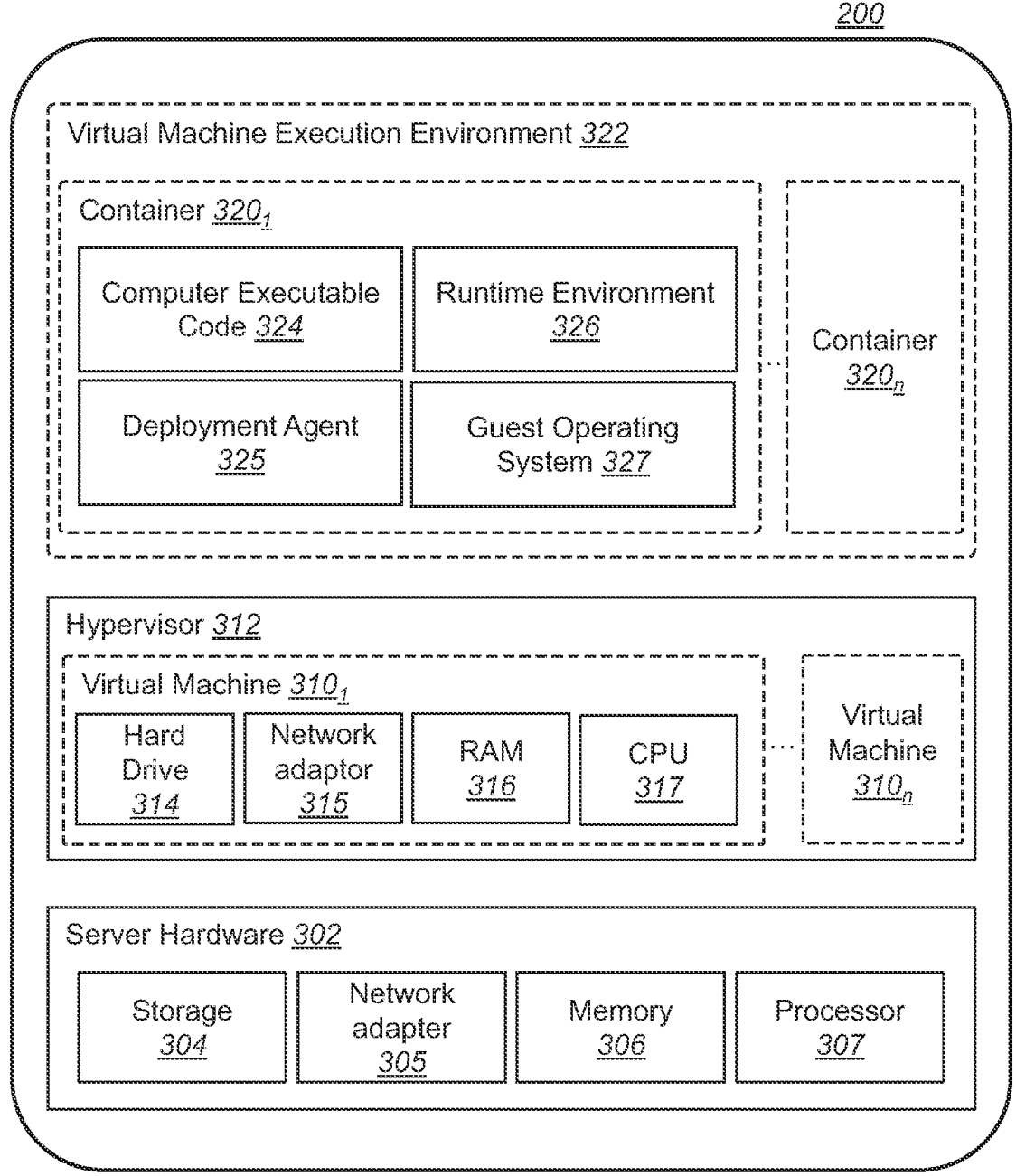
FIG. 3 is a schematic of an exemplary computer hardware for implementing a method of the invention.

FIG. 3 is a schematic of an exemplary server 200 for implementing a method of the invention. In particular, FIG. 3 depicts server 200 comprising server hardware 302 and virtual machine execution environment 332 having containers 320 with computer executable code 324. The server hardware 302 may include local storage 304, such as a hard drive, network adapter 305, system memory 306, processor 307 and other I/O devices such as, for example, a mouse and keyboard (not shown).

A virtualisation software layer, also referred to as hypervisor 312, is installed on top of server hardware 302. Hypervisor 312 supports virtual machine execution environment 332 within which containers 320 may be concurrently instantiated and executed. In particular, each container 320 provides computer executable code 324, deployment agent 325, runtime environment 326 and guest operating system 327 packaged into a single object. This enables container 320 to execute computer executable code 324 in a manner which is isolated from the physical hardware (e.g. server hardware 302, cloud environment hardware 202), allowing for consistent deployment regardless of the underlying physical hardware.

As shown in FIG. 3, virtual machine execution environment 332 of server 200 supports a plurality of containers $320_1$ to $320_n$. Docker is an example of a virtual machine execution environment 332 which supports containers 320.

For each container $320_1$ to $320_n$, hypervisor 312 manages a corresponding virtual machine $310_1$ to $310_n$ that includes emulated hardware such as virtual hard drive 314, virtual network adaptor 315, virtual RAM 316, and virtual central processing unit (CPU) 317. For example, virtual machine 310 may function as an equivalent of a standard x86 hardware architecture such that any x86 supported operating system, e.g., Microsoft Windows, Linux, etc., may be installed as a guest operating system 327 to execute computer executable code 324 for container 320. Container 320 may be provided by virtualisation environment 220, as previously discussed for FIG. 2.

Hypervisor 312 is responsible for transforming I/O requests from guest operating system 327 to virtual machines 310, into corresponding requests to server hardware 302. In FIG. 3, guest operating system 327 of container 320 supports the execution of deployment agent 325, which is a process or daemon that communicates (e.g., via addressing and discovery layer 224) with cloud controller 236 to receive and unpack computer executable code 324 and its deployment package. Deployment agent 325 also communicates with router 236 to provide network routing information for computer executable code 324 that have been deployed in container 320. Guest operating system 327 further supports the execution of runtime environment 326 within which computer executable code 324 is executed.

It should be recognized that the various layers and modules described with reference to FIG. 3 are merely exemplary, and that other layers and modules may be used with the same functionality without departing from the scope of the invention. It should further be recognized that other virtualised computer architectures may be used, such as hosted virtual machines.

Protected Data and Protected Computer Executable Code

As mentioned above, computer executable code 324 may process data or use data when computer executable code 324 is executed. Examples of processing data includes, for instance, performing a mathematical transform via computer executable code 324 on data, or performing statistical analysis via computer executable code 324 on data. Using data includes, for example, accessing a database and using data contained in the database to provide insights into other data. Data that is processed or used by computer executable code 324 is made available to the cloud environment 100 from internally within the cloud environment 100, externally by one or more external provides 150, and/or externally by the secure provider 130.

Data that is provided by secure provider 130 may be protected data. Protected data, as referred to herein, is data that requires protecting due to its cognitive content. This means that protected data may have or require additional security provisions to prevent unauthorised access to data. Moreover, the storage and processing of protected data may be restricted. In some instances, the restriction is caused by local legislation, for example General Data Protection Regulation (GDPR) in the European Union, and the Data Protection Act 2018 in the United Kingdom.

Protected data may include personal data, i.e. information relating to an identified or identifiable natural person. For example, protected data may include a name, an identification number, location data, an online identifier or one or more factors specific to the physical, physiological, genetic, mental, economic, cultural, or social identity of a natural person. Additionally, or alternatively, protected data may include financial data.

In addition to or as an alternative to providing protected data, secure provider 130 may provide protected computer executable code. Protected computer executable code, as referred to herein, is computer executable code 324 that requires protecting due to its cognitive content. Thus, protected computer executable code may have or require additional security provisions to prevent unauthorised access to or use of the computer executable code.

Protected computer executable code may include, for example, computer executable code that is in development, and/or commercially sensitive computer executable code. Additionally, or alternatively, protected computer executable code may be computer executable code that processes or uses protected data.

Executing computer executable code 324 that interacts with protected data cannot be performed in a typical cloud environment in a secure manner because of the inherent security risks. Similarly, protected computer executable code cannot be executed in a typical cloud environment in a secure manner due to the inherent security risks. One such security risk is that the interactive access provided to parties other than the secure provider 130 (e.g. user 140, one or more external providers 150 or third party provider) is misused, enabling the parties other than the secure provider 130 to access the protected data, the protected computer executable code, and/or execute the computer executable code with the protected data. Another security risk is that the protected data is exposed to user 140 within cloud environment 100. A further security risk is that protected data is leaked to outside cloud environment 100.

Secure Portion

Figure 4:
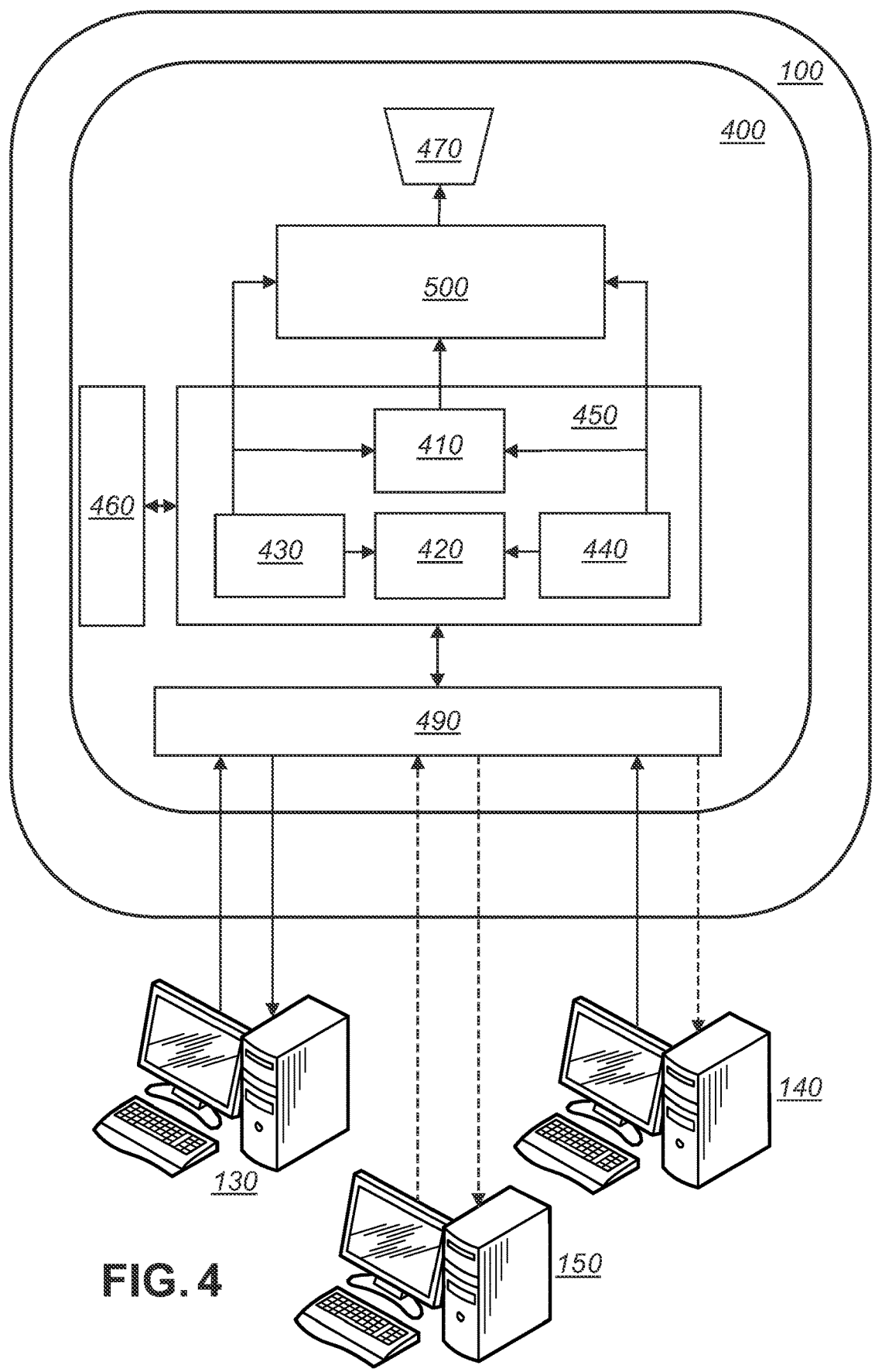
FIG. 4 is a schematic of a third-party cloud environment for securely processing data according to the invention.

With reference to FIG. 4, secure portion 400 (a secure portion processing module) is provided in cloud environment 100 to implement a method of securely processing data according to the invention. Secure portion 400 is a module of the cloud environment 100 which is under the control of secure provider 130. In other words, the secure provider 130 has administrative rights over secure portion 400 of cloud environment 100.

The secure portion 400 is hosted by cloud environment hardware 202 on one or more servers $200_1$ to $200_n$. For each server $200_1$ to $200_n$, secure portion 400 is hosted by server hardware 302 on one or more virtual machines $310_1$ to $310_n$. Further, one or more virtual machines $310_1$ to $310_n$ may host one or more containers $320_1$ to $320_n$, where each of the one or more containers $320_1$ to $320_n$, comprises at least a part of secure portion 400.

The secure portion 400 may be communicatively coupled to virtualisation environment 200, orchestration component 222, addressing and discovery layer 224, router 236, cloud controller 238, service provisioner 230 and execution environment 232. Additionally, or alternatively, the secure portion may comprise one or more of virtualisation environment 200, orchestration component 222, addressing and discovery layer 224, router 236, cloud controller 238, service provisioner 230 and execution environment 232.

Secure portion 400 comprises one or more accounts (e.g. experimental build account 450, shared services account 460). The term "account", as used herein, refers to a user account, i.e. an established connection between the third party of cloud environment 100 and user 140 or secure provider 130. Each account is used to define a specific boundary for hosting specific services for user 140 and/or secure provider 130. This is achieved by defining for each account a predetermined level of access for user 140 or secure provider 130 to various modules and processes, as is discussed in detail below. By implementing more than one account, the secure portion 400 provides increased security since each account has to be breached separately. In particular, having more than one account reduces the overall accessibility to the secure portion 400 by the user 140, lowering the chance of protected data being leaked outside the secure portion 400. In certain cloud environments 100, there are ways to circumvent the need to breach each account separately, such as performing a higher level security breach. In one example where cloud environment 400 is Amazon Web Services (AWS) and the accounts are AWS accounts, the AWS control plane would have to be breached to gain access to each of the separated AWS accounts. However, higher level security breaches are much more difficult to perform, which means that the chance of a breach is greatly reduced, and security is increased.

A security gateway 490, such as a Mulesoft gateway, is implemented in secure portion 400 to ensure that protected data and protected computer executable code is not being leaked outside secure portion 400 to third parties. Moreover, the security gateway 490 is configured to control requests for external data to be received into the secure portion 400 from external data sources (see below).

Creation of one or more accounts is provisioned by the third party cloud environment 100 in response to a manual request from user 140 or secure provider 130, or in response to an automated request from the secure portion 400. Each of the one or more accounts can be configured to provide a predetermined level of access to various modules and processes of cloud environment 100 for user 140 or secure provider 130. The predetermined level of access may be set at creation of the account and/or may be modified subsequently by secure provider 130.

Secure portion 400 comprises one or more VPCs (virtual private cloud) corresponding to the one or more accounts. A VPC is a virtual network dedicated to the respective account which is logically isolated from other virtual networks and therefore other accounts in cloud environment 100. The VPC of each account may be private, i.e. cannot be connected to communication network 110, in order to provide additional security. Alternatively, or additionally, each account may have controls to prevent access to communication network 110 being added. By using a VPC and/or controls to prevent access to communication network 110 being added, user 140 is unable to leak protected data outside of secure portion 400 via the computer executable code or otherwise.

Each account within secure portion 400 is configured with multi-factor authentication to ensure that a person, e.g. user 140, attempting to access an account is authenticated to do so. If user 140 fails to authenticate themselves via the multi-factor authentication, then user 140 is blocked from accessing the account until a review is performed by secure provider 130. Multi-factor authentication may be provided by, for example, Symantec VIP.

Secure portion 400 is configured to log data traffic for the one or more accounts. For example, secure portion 400 may log data traffic of outgoing data requests, including requests for services, such as to user 140, to one or more external providers 150 or to secure provider 130 for protected data. Moreover, secure portion 400 is configured to analyse the data traffic to identify data requests. For example, secure portion 400 identifies outgoing data requests, including requests for protected data from secure provider 130. Moreover, secure portion 400 identifies incoming data requests, including requests from user 140. This is to determine whether there are any unexpected requests being sent or received by computer executable code which may pose a security risk. The data traffic logs are made available to the secure provider 130, but not available to user 140. Additionally, or alternatively, the data traffic logs are sent to a first monitoring service which collects and monitors the logs, collects and tracks metrics, sets alarms, automatically reacts to changes in outgoing data requests, and the like. An example monitoring service is Amazon CloudWatch.

A particular type of data traffic which secure portion 400 is configured to log is VPC flow. VPC flow logs capture information about the IP traffic going to and from network interfaces of a VPC. The VPC flow logs are sent to a second monitoring service which collects and monitors the logs, collects and tracks metrics, sets alarms, automatically reacts to changes in outgoing data requests, and the like. An example monitoring service for VPC flow is Amazon GuardDuty.

Secure portion 400 is configured log execution information from executing the computer executable code to process the data. The execution logs may contain, for example, information on one or more failures that occurred when executing the computer executable code, in addition to or as an alternative to information on one or more successes that occurred when executing the computer executable code. The execution logs may be made available to the user 140 and/or the secure provider 130, depending on the configuration of the particular account.

Each of the one or more accounts restricts its access to user 140. For example, each account may be configured such that access by user 140 is time restricted. This is intended to reduce the window for misuse of the protected data or protected computer executable code by user 140. In one example, the access is time restricted in that access is only available for a predetermined time period. The predetermined time period may be, for example, 10 minutes, 30 minutes, 1 hour, 3 hours, 1 day, 3 days, etc., depending on the nature of the computer executable code and the time taken to process the data. In another example, access is only available during predetermined times of the day and/or predetermined days of the week. For example, the access may be restricted to between 9 AM and 5 PM on Monday, Tuesday, Wednesday, Thursday, and Friday. In another example, accessibility by user 140 to each account is restricted by ensuring user 140 is within a predetermined IP range. In other words, user access is restricted if the IP of the user is outside a predetermined IP range. In a further example, accessibility by user 140 to each account is restricted by geographic region. In other words, user access is restricted if the region of the user is outside a predetermined region. This means that, for instance, user 140 in North America cannot access an account that is intended to be used in Europe. The restrictions may be used in each of the one or more accounts in combination, and any combination of the restrictions is possible.

As shown in FIG. 4, secure portion 400 of cloud environment 100 comprises experimental build account 450. Experimental build account 450 is configured to manage computer executable code and data received from user 140 or secure provider 130 for execution. Note that the term "experimental build" is an appellative and is not intended to imply features or functionality beyond that described herein. The predetermined level of access of experimental build account 450 is preferably that user 140 does not have administrative access to any module or process in secure portion 400. This is so user 140 cannot misuse secure portion 400, and enable parties other than the secure provider 130 to access the protected data and/or execute the computer executable code with protected data. User 140 may only access experimental build account 450 and therefore secure portion 400 via first virtual desktop 440, as is discussed herein.

Experimental build account 450 may be created in response to a manual request from secure provider 130 when a new user 140 desires to execute computer executable code, may be created in response to a manual request from secure provider 130 when secure provider 130 desires to execute computer executable code, or may be created in response to an automated request from secure portion 400. The experimental build account 500 is user-specific, such that the experimental build account 500 can be used for executing a plurality of different computer executable codes from a particular user 140 or executing a plurality of different datasets from a particular user 140.

Experimental build account 450 comprises a VPC (virtual private cloud). As previously mentioned, a VPC is a virtual network dedicated to experimental build account 450 which is logically isolated from other virtual networks and therefore other accounts in cloud environment 100. Secure provider 130 specifies an IP address range for the VPC, add subnets, associate security groups, and configure route tables for the VPC. The VPC of experimental build account 450 may be private, i.e. cannot be connected to communication network 110. Moreover, experimental build account 450 may have controls to prevent access to communication network 110 being added to experimental build account 450. By using a VPC and/or controls to prevent access to communication network 110 being added to experimental build account 450, user 140 is unable to leak protected data or protected computer executable code outside of secure portion 400 via the computer executable code or otherwise. Alternatively, the VPC of experimental build account 450 may be public, i.e. can be connected to communication network 110. In other embodiments, the VPC is private and a security gateway is used.

Experimental build account 450 may be configured to store protected data input into cloud environment 100 from secure provider 130. In such embodiments, the protected data from secure provider 130 is preferably stored only temporarily and is encrypted. Alternatively, protected data input into cloud environment 100 from secure provider 130 may be stored directly in pipeline 500 which is used for executing the computer executable code. In either case, experimental build account 450 is configured to store data input into cloud environment 100 from user 140 in experimental build account 450. The data from user 140 may be stored temporarily or persistently, and may or may not be encrypted, depending on the requirements of user 140.

Experimental build account 450 is also configured to store computer executable code provided from user 140 and protected computer executable code provided from secure provider 130. The experimental build account 450 scans computer executable code from user 140 for malware, i.e. computer executable code that is specifically designed to disrupt, damage, or gain unauthorised access to any part of cloud environment 100. If any malware is detected, then the computer executable code is removed from experimental build account 450 and from the secure portion entirely. The protected computer executable code from secure provider 130 is preferably stored only temporarily.

Experimental build account 450 is accessible to user 140 via a first virtual desktop 440 in experimental build account 450, and to secure provider 130 via a second virtual desktop 430 in experimental build account 450. When the data or computer executable code is received from user 140, the first virtual desktop 440 allows the user 140 to access the data or computer executable code, whilst the second virtual desktop 430 does not allow the secure provider 130 access the data or computer executable code. Likewise, when the protected data or protected computer executable code is received from secure provider 130, the second virtual desktop 430 allows the secure provider 130 to access the protected data or protected computer executable code, whilst the first virtual desktop 440 does not allow the user 140 access the protected data or the protected computer executable code. Advantageously, by using virtual desktops 430, 440 it is not necessary to create a VPN (Virtual Private Network) connection from user 140, nor is it necessary to use Bastion Hosts (e.g. a secure shell protocol or a remote desktop protocol), which are more complex to secure and manage. Each of the virtual desktops 430, 440 may be, for example, an Amazon Workspace.

First virtual desktop 440 is the only interactive access that user 140 has to secure portion 400. By applying appropriate security provisions to the first virtual desktop 440, interaction between user 140 and secure portion 400 can be controlled such that the user 140 is restricted from retrieving output data from secure portion 400. In this content, "retrieving" means to take outside of secure portion 400. For instance, the ability to copy files to the clipboard of virtual desktop 440 may be is disabled. This stops user 140 retrieving data from first virtual desktop 440 in secure portion 400 to their own device. Additionally, or alternatively, access to communication network 110 from experimental build account 440 may be disabled to prevent protected data or protected computer executable code being leaked outside the first virtual desktop 440 by user 140 to.

First virtual desktop 440 is the only access user 140 has to the stored computer executable code before and after the computer executable code is executed with protected data. By "access" it is meant that user 140 can install, view, and modify the computer executable code, but cannot retrieve the computer executable code from secure portion 400. In particular, user 140 may modify the computer executable code on first virtual desktop 440. However, the modified computer executable code cannot be retrieved from first virtual desktop 440 as user 140 is restricted from retrieving data from secure portion 400 for the reasons described above.

Access to first virtual desktop 440 by user 140 is provisioned by a session manager, for example AWS Session Manager. The session manager is configured to restrict access to user 140 in the same way as described above in relation to the one or more accounts. For example, the session manager may be configured such that access by user 140 to first virtual desktop 440 is time restricted. The time restriction may be different to, preferably less than, the restriction for the one or more accounts.

Each of the virtual desktops 430, 440 is provisioned by one or more virtual machines 310₁ to 320ₙ, and hosted in one of the plurality of containers 320₁ to 320ₙ. For example, virtual desktop 430 may be provided by guest operating system 327 of first container 320₁, and virtual desktop 440 may be provided by guest operating system 327 of second container 3022. Containerisation enables the computer executable code to be fully isolated from modules and processes external to secure portion 400. The containers run in response to submission of task definitions which describes the container and volume definitions of the task. For example, in an implementation based on AWS and Docker, the Docker contains are run by submission of ECS task definitions. These task definitions are picked up by the ECS agent (itself a Docker container running on the EC2 host).

When experimental build account 450 receives computer executable code from user 140, access to the experimental build account 450, particularly the first virtual desktop 440, and more particularly the computer executable code, is provided to user 140 by a private link. This eliminates the exposure of the data to communication network 110, which may be a public communication network such as the Internet, and ensures that a transport layer security is utilised between user 140 and secure portion 400. In this way, it is possible to restrict output data to within the secure portion 400. An example private link provider is AWS PrivateLink. With AWS PrivateLink, connectivity over Transmission Control Protocol (TCP) can be established.

Experimental build account 450 is configured to receive, from user 140 or secure provider 130, a request to execute computer executable code. The request may be viewable on virtual desktop 430 and/or on virtual desktop 440. The computer executable code is then sent to data security validation module 420, which may be contained within experimental build account 450 or may be isolated in secure portion 400. Data security validation module 420 is has similar functionality to service provision 230 of FIG. 2. Thus, data security validation module 420 validates outgoing data requests in the computer executable code, such requests for protected data from secure provider 130. An example data security validation module 420 is AWS CodeCommit.

Data security validation module 420 is configured to determine a level of restricted access of the protected data that is being requested by the computer executable code. Using the level of restricted access, data security validation module 420 modifies the request for protected data to remove any request for protected data which has a level of restricted access above a certain threshold. For example, data security validation module 420 may identify that the computer executable code requests two datasets from secure provider, the first dataset relating to information in the public domain and the second dataset relating to information protected by secure provider 130. The request may be modified to remove the second dataset.

Any removed request for protected data may be replaced by a request for pseudonymised data. Pseudonymised data is data in which the data structure remains the same as the protected data, but where cognitive content is replaced by one or more artificial identifiers or pseudonyms.

When receiving a request for protected data, or a request for pseudonymised data, the secure provider removes a subset of data of the protected data from being sent to secure portion 400 which has a level of restricted access above a certain threshold. For instance, the subset of the data removed may be the cognitive content of the data, which is replaced by one or more artificial identifiers or pseudonyms, causing the remaining subset of the data to be pseudonymised data.

The certain threshold of the level of restricted access for protected data is based on the account of secure portion which computer executable code is being executed in. For example, for experimental build account 450, which is accessible to user 140 via first virtual desktop 440, the certain threshold is lower than for accounts in pipeline 500 which do not allow access for user 140. Protected data is not made available for processing in accounts in which user 140 has interactive access, since the chance of the protected data being misused or leaked by user 140 is increased compared to accounts in which the user 140 does not have interactive access.

The computer executable code is also sent to pipeline generator 410, which is contained within experimental build account 450. Pipeline generator 410 is responsible for generating a pipeline 500 for executing the computer executable code with the data. Generating pipeline 500 is performed automatically by pipeline generator 410 upon receipt of the computer executable code from experimental build account 450. An example pipeline generator 410 is AWS CodePipeline. Preferably pipeline 500 has a plurality of accounts which have different accessibility to user 140, including accounts which have the same access as experimental build account 450 and accounts which have no access to the user 140 whatsoever.

Once pipeline 500 has been generated, the computer executable code and the data is sent to pipeline 500 for executing the computer executable code with the data solely within the secure portion 400. Data resulting from executing the computer executable code in pipeline 500, referred to herein as output data, is stored in secure bucket 470 in secure portion 400. In some embodiments, all of the output data is stored in secure bucket 470 to restrict user 140 from retrieving the output data. In other embodiments, only a protected subset of the output data is stored in secure bucket 470. The term "bucket" is intended to refer to a resource in an object storage service, such as Amazon S3. The default security settings for secure bucket 470 is to deny any access requests by user 140. Thus, output data cannot be retrieved by user 140 from secure bucket 470. However, a break glass policy may be implemented in order to allow user 140 to override certain security controls in the event of an emergency (e.g. a critical error in processing the computer executable code). The output data contained in the secure bucket 470 is preferably encrypted.

In embodiments where only a protected subset of the output data is stored in the secure bucket 470, an unprotected subset of the output data is accessible to user 140. By "access" it is meant that user 140 can view the output data in secure portion 400, but not retrieve the output data from secure portion 400. In some examples, the unprotected subset comprises only a summary of the output data. The summary may be formed by removing the cognitive content of the data and/or by aggregating the output data. In other examples, the unprotected subset comprises a visual report. The visual report may be based on the summary or based on the data traffic logs and/or the execution logs captured by secure portion 400. Access to the unprotected subset is provided to user 140 via the first virtual desktop 440. As previously mentioned, by applying appropriate security provisions to the first virtual desktop 440, interaction between user 140 and secure portion 400 can be controlled such that the user 140 is restricted from retrieving output data, including the unprotected subset, from secure portion 400. Moreover, the private link previously mentioned may be used for accessing the unprotected subset of the output data via the first virtual desktop 450.

As shown in FIG. 4, secure portion 400 of cloud environment 100 comprises other accounts. For example, secure portion 400 comprises shared services account 460. Shared services account 460 comprises an update service server, for example WSUS (Windows Server Update Service). The patching schedule for secure portion 400 is managed via a patch manager, for example AWS Patch Manager, and the patches are provided by the update service server. This allows secure portion 400 to be patched if new security threats arise. Shared services account 460 also comprises a directory service, for example AWS Directory Service. The directory service allows secure provider 130 to manage the one or more accounts in secure portion 400. More particularly, the directory service allows secure provider 130 to modify the predetermined level of access of each account. This allows access to be manually revoked should a security threat arise.

Other accounts, which are not shown in FIG. 4, may be present in secure portion 400. For example, as mentioned above, pipeline 500 comprises a plurality of accounts. When computer executable code is received from user 140, accounts in pipeline 500 which enable user 140 to access and modify the computer executable code do not have access to communication network 110 (e.g. the Internet) to prevent egress of any output data to outside secure portion 400.

Method for Securely Processing Protected Data

Figure 5:
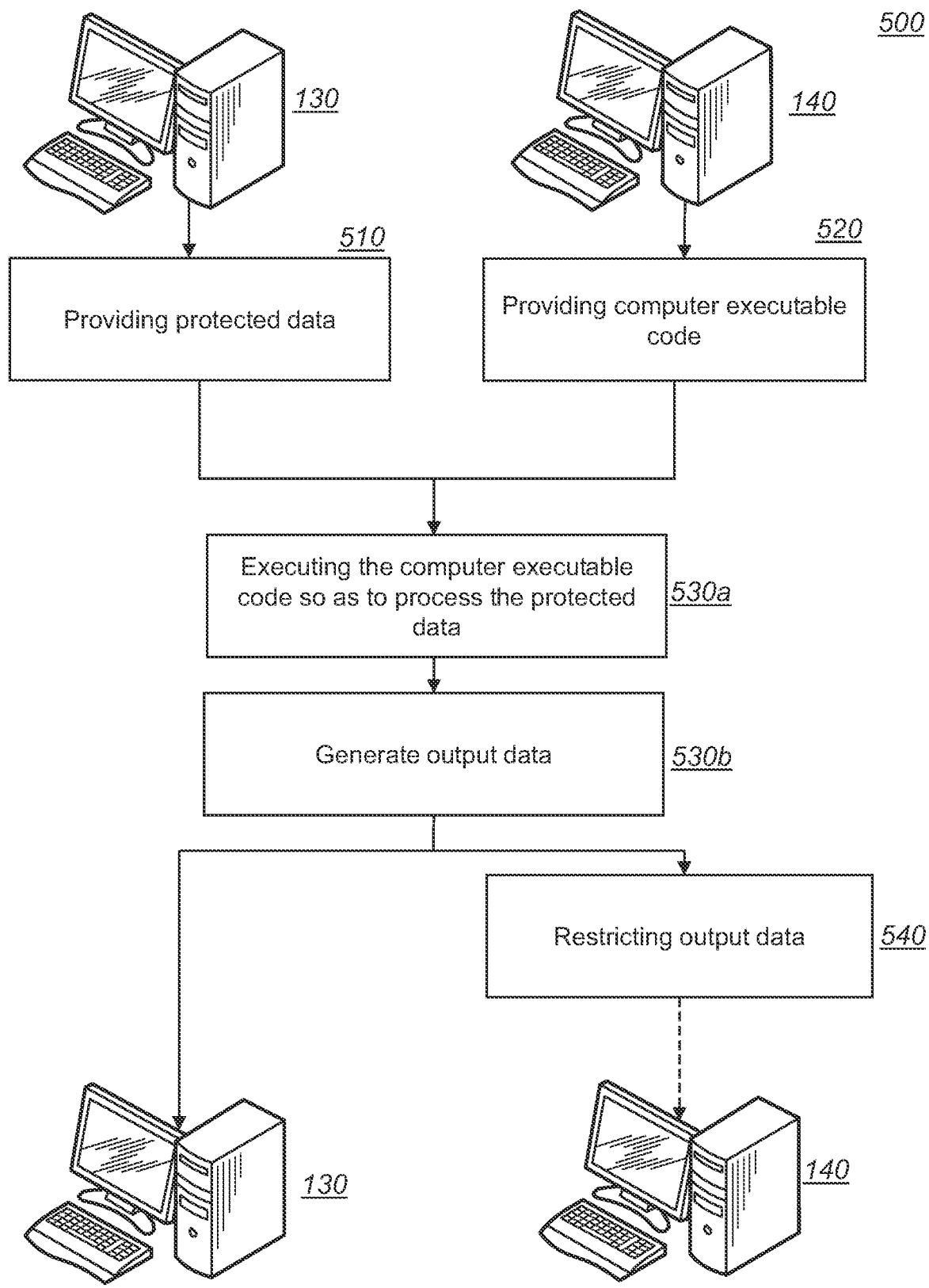
FIG. 5 is a flow diagram of a first method of securely processing data in a third-party cloud environment according to the invention.

FIG. 5 shows an exemplary method of securely processing protected data in a third-party cloud environment according to the invention. In this exemplary method, protected data is provided by secure provider 130 and computer executable code is provided by user 140. Steps 510 to 540, and other optional steps, are discussed in detail below.

Before the method commences, user 140 is granted access to secure portion 400 of cloud environment 100 by secure provider 130. As a result, user 140 has access to experimental build account 450 via first virtual desktop 440. The access granting procedure for secure portion 400 may include identifying information about user 140, including IP address, region of access, and time of access.

In the first step 510 of FIG. 5, user 140 provides computer executable code to cloud environment 100, in particular to the secure portion 400 of cloud environment 100. The computer executable code is stored within experimental build account 450 and is accessible to user 140 via the first virtual desktop 440. Using the first virtual desktop 440, user 140 can modify the computer executable code. However, there is no access to protected data for user 140 at this stage via the first virtual desktop 440 or otherwise.

Upon receipt of the computer executable code from user 140, the experimental build account 450 scans computer executable code for malware. If any malware is detected, then the computer executable code is removed from experimental build account 450 and from the secure portion 400.

In step 520, protected data is provided from secure provider 130 to secure portion 400 of cloud environment 100, where the protected data is stored. In particular, protected data may be provided from secure provider 130 to experimental build account 450, where it is only accessible to secure provider 130 via a second virtual desktop 430. Alternatively, protected data may be provided from secure provider 130 directly to pipeline 500 which is used for executing the computer executable code. The protected data is then stored in the experimental build account 450 or pipeline 500, whichever it is sent to. It is preferred that the protected data is stored only temporarily (e.g. for up to the predetermined time period) and is encrypted.

The protected data is provided from secure provider 130 to secure portion 400 in response to a request for protected data from the computer executable code. Thus, step 520 comprises receiving at secure provider 130 a request for protected data from the computer executable code in secure portion 400. To this end, the computer executable code comprises a request for protected data, such as access to an API of secure provider. Receipt of the request may arise as a consequence of the computer executable code executing in the secure portion 400, in particular in pipeline 500, or may be caused by data security validation module 420 scanning the computer executable code for requests whilst the computer executable code is stored in experimental build account 450.

Before receiving the protected data from secure provider 130, data security validation module 420 validates the request for protected data. If the request is deemed to be a valid request, then secure provider 130 enables provision of the data being requested to secure portion 400 of cloud environment 100. However, if the request is not deemed to be a valid request, then secure provider 130 will not enable provision of the data being requested to secure portion 400 of cloud environment 100. Requests that are deemed not to be valid include, for example, requests that call for more data than is necessary to execute computer executable code.

The request for protected data may be partially valid, that is to say that a subset of the data has a level of restricted access above a certain threshold. In such cases, the data security validation module 420 modifies the request before it is sent to the secure provider 130 to remove any request for protected data which has a level of restricted access above the certain threshold, such that the request for the subset of the data is not received by the secure provider 130. The removed request may be replaced by a request for pseudonymised data. As previously described, the certain threshold is based on the account of secure portion 400 which the computer executable code is to be executed in, and thus the account of secure portion 400 which the protected data is to be processed.

In response to receiving a request for protected data which is partially valid the secure provider 130 removes the subset of the data which has a level of restricted access above a certain threshold. The remaining subset of the data is sent to secure portion 400. In one example, the removed subset of the data is the cognitive content of the data, and the remaining subset of the data is pseudonymised data.

In step 530a, the computer executable code is executed in the secure portion 400 of the cloud environment 100 so as to process the protected data solely within secure portion 400. Preferably, the computer executable code is executed so as to process the protected data in pipeline 500, and more specifically in an account of pipeline 500 to which user 140 has no access. Other accounts in pipeline 500 and secure portion 400 may be used as an alternative or in addition; however, it is preferred that pseudonymised data is provided for these accounts instead of protected data due to accessibility to the account by user 140.

Regardless of which account the computer executable code is executed in within secure portion 400, the secure portion 400 may log traffic data and send the data traffic logs to a monitoring service which reacts to changes in the request for protected data. This is to ensure that protected data is not egressed out of the secure portion 400 to user 140 or one or more external providers 150.

In some circumstances, user 140 may wish to modify the computer executable code stored in secure portion 400 before processing the protected data. Thus, in such circumstances, step 530a additionally comprises modifying the computer executable code itself within secure portion 400 of cloud environment 100. User 140 can modify the computer executable code within experimental build account 450 of secure portion 400 via first virtual desktop 440. User 140 can additionally or alternatively modify the computer executable code within pipeline 500 of secure portion 400. In particular, modifying can be performed in at least one of the accounts in the pipeline 500.

In step 530b, once the protected data has been processed, output data will be generated. Output data may itself be protected data.

In step 540, user 140 is restricted from retrieving the output data from the secure portion 400 of cloud environment 100. In some embodiments, this restriction may prevent user 140 from obtaining any of the output data from the secure portion 400 of cloud environment 100. In such embodiments, all of the output data is stored to secure bucket 470 in secure portion 400, which is not accessible by user 140.

In other embodiments, user 140 is prevented from obtaining a protected subset of the output data from secure portion 400 of cloud environment 100, but allowed to access an unprotected subset of the output data. The protected subset of the output data is stored to secure bucket 470 in secure portion 400, which is not accessible by user 140. As mentioned previously, the unprotected subset of the output data may comprise, for example, only a summary of the output data, or a visual report provided to user 140.

User 140 accesses the unprotected subset of the output data via first virtual desktop 440 in secure portion 400. First virtual desktop 440 restricts the user from retrieving unprotected subset from the from secure portion 440 by, for example, disabling the ability to copy files to the clipboard of the first virtual desktop 440, and/or disabling access from the first virtual desktop 440 to the communication network 110, as discussed above. Access by user 140 to the unprotected subset in first virtual desktop 440 is restricted via a session manager.

Step 540 further comprises sending a private link to user 140 for accessing the unprotected subset of the output data via first virtual desktop 440. In this way, the output data is not made available to communication network 110, which is a public communication network, and is restricted to within secure portion 400.

As mentioned above, first virtual desktop 440 is hosted by an experimental build account 450 in secure portion 400. The experimental build account 450 comprises a VPC which prevents users from accessing the communication network 110 from the first virtual desktop 440. Additionally, or alternatively, a security gateway is provided in experimental build account 450 to prevent user 140 from accessing the communication network 110 from the first virtual desktop 440. Secure portion 400 monitors the VPC flow logs to ensure that there is no unusual data flows from the experimental build account VPC. Secure provider 130 may be alerted if unusual data flows are detected.

Additional security measures are implemented by experimental build account 450 to ensure that the user is restricted from retrieving output data. In particular, user 140 performs multi-factor authentication to access experimental build account 450. Additionally, user access to experimental build account 450 is time restricted, by a predetermined time period and/or during predetermined times of the day and/or predetermined days of the week. Further, access to experimental build account 450 for user 140 is restricted if the IP of the user is outside a predetermined IP range. Moreover, access to experimental build account 450 for user 140 is restricted if the region of the user is outside a predetermined region. By restricting access to experimental build account 450, the user is not able to access first virtual desktop 440, and therefore cannot access or retrieve computer executable code or the unprotected subset of the output data.

When step 530a comprises modifying the computer executable code itself within secure portion 400 of cloud environment 100, step 540 may additionally comprise restricting the user from retrieving the computer executable code from the secure portion 400. In particular, when user 140 can modify the computer executable code within experimental build account 450 of secure portion 400 via first virtual desktop 440, user 140 is prevented from retrieving the modified computer executable code since access to the communication network 110 from the experimental build account 450 is disabled. For pipeline 500, user 140 is prevented from retrieving the modified computer executable code since access to the communication network 110 is disabled for the account in which the computer executable code can be modified.

Method for Securely Processing Protected Computer Executable Code

Figure 6:
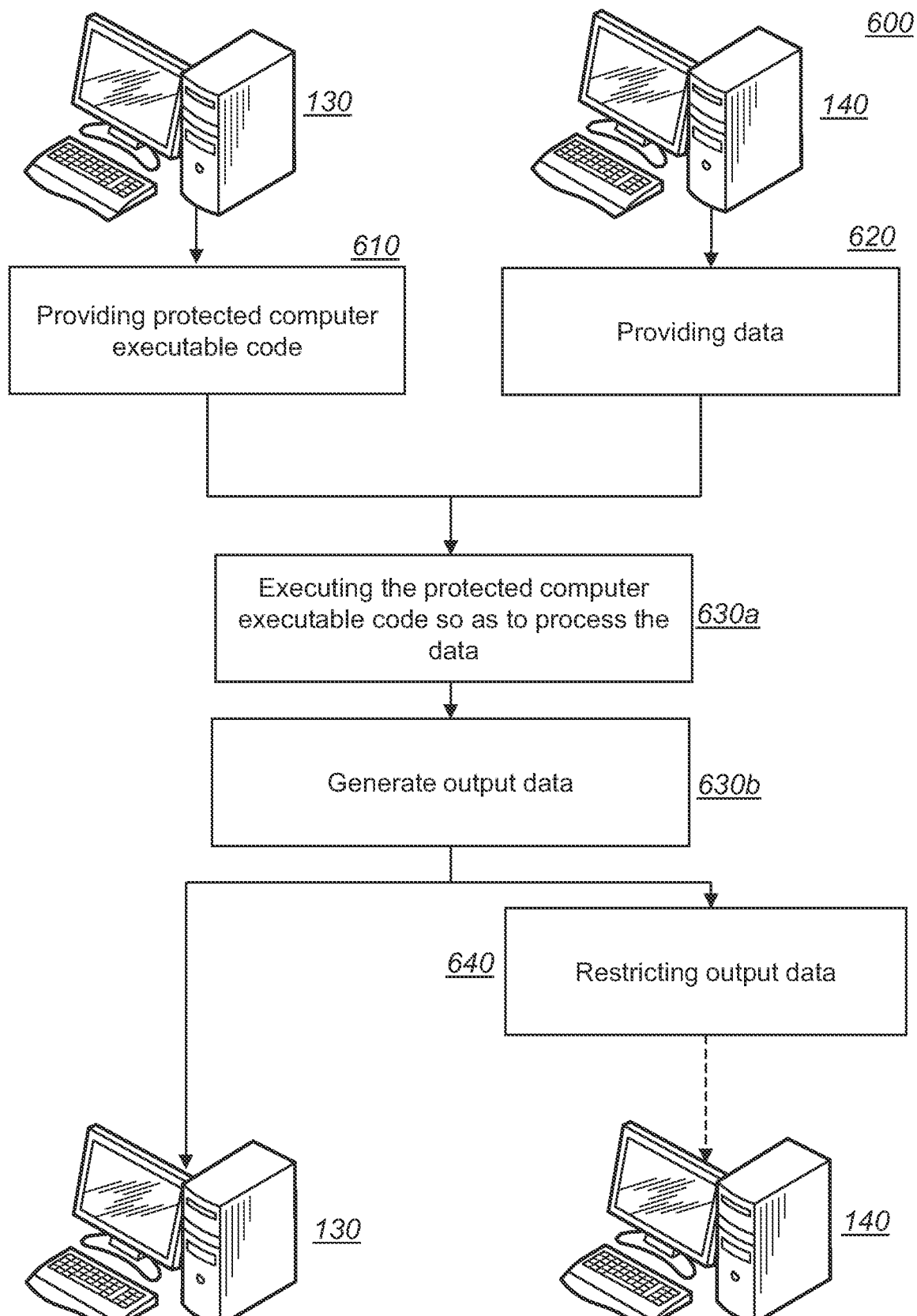
FIG. 6 is a flow diagram of a second method of securely processing data in a third-party cloud environment according to the invention.

FIG. 6 shows a second exemplary method of securely processing data in a third-party cloud environment according to the invention. In this exemplary method, protected computer executable code is provided by secure provider 130 and data is provided by user 140. Steps 610 to 640, and other optional steps, are discussed in detail below.

The method of FIG. 6 is substantially similar to the method of FIG. 5, except that in step 620 user 140 provides data instead of computer executable code, as in step 520. Further, in step 610, secure provider 130 provides protected computer executable code instead of protected data, as in step 510. Secure portion 500 is intended to support both exemplary methods, such that no modifications are required to secure portion 500 when implementing the method of FIG. 6 compared to the method of FIG. 5.

When storing the protected computer executable code in secure portion 400, this is stored within experimental build account 450 of secure portion 440, and only accessible to secure provider 130 via second virtual desktop 430. Moreover, should user 140 deem that their data should not be seen by secure provider 130, data provided from user 140 to secure portion 400 is stored in experimental build account 450 and is only accessible to user 140 via first virtual desktop 440.

Notably, step 640 of restricting output data additionally comprises preventing user from accessing any of the computer executable code from the secure portion 400 of cloud environment 100. This is achieved by not giving user 140 access to the protected computer executable code in experimental build account 450 via first virtual desktop 440. The protected computer executable code can only be accessed by secure provider 130 by the second virtual desktop 430.

Other than the differences mentioned above, the method of FIG. 6 is otherwise the same as the method of FIG. 5, having the same restrictions for output data.

Method for Securely Requesting External Data

Figure 7:
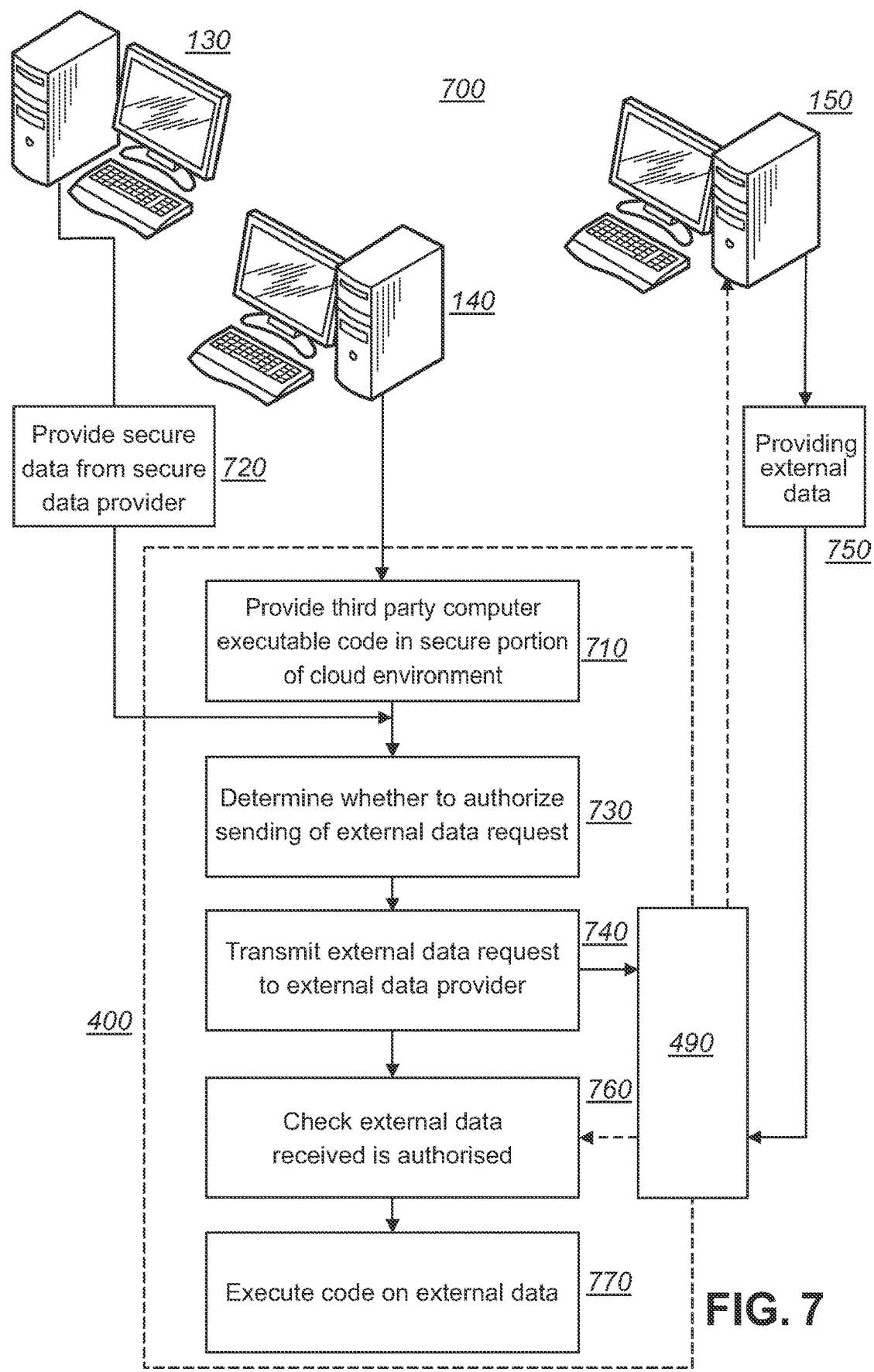
FIG. 7 is a flow diagram of a further method of securely processing data in a third-party cloud environment according to the invention.

FIG. 7 shows a further exemplary method 700 of securely processing data in a third-party cloud environment according to the invention. In this exemplary method, protected computer executable code is provided by a third party user 140 into the secure portion 400. The security gateway 490 provides access control on data being requested and received by the third party executable code provisioned 710 in the secure portion by the third party user 140.

The third party code is executed in the secure portion to request and receive 720 secure data from the secure data provider 130. As mentioned above, this secure data is held with the secure data provider 130 on a confidential basis and is not authorised for general distribution externally, e.g. out of the control or domain of the secure data provider 130; it may be encrypted. However, such secure data may be required for fulfilling data requests sent to external third party data sources, e.g. to external data provider 150 which is not under the control of the secure data provider 130. Typically, the external data requested from the external data provider 150 is additional data which may be required by the third party code when processing the secure data; this additional data not being available from the secure data provider 130.

An external data request generated by the third party code can thus utilise at least a portion of the secure data, for example user sensitive or confidential information typically stored by the secure data provider 130 such as customer names, addresses, account information, payment information, tax information and numbers etc. The external data request could be made by way of an API (application programming interface) call to the external data provider 150, with the API call containing one or more components of the secure data to enable lookup and access of appropriate external data which is relevant or associated with the one or more components of secure data. The API call itself will typically be made as an encrypted data request, as is commonly known in the art, such that the secure data being sent in the call is protected from being viewed by a malicious party. However, a check is made within the third party cloud environment as to whether the external data provider 150 is sufficiently trusted and secure to receive the components of secure data, since otherwise the secure data could be at risk when in decrypted from the data request at the external data provider. This has to be seen additionally in the context of the third party cloud computing environment 100 which is external to secure data provider 130, although under its control, but which is also executing third party user code which has not been generated by the secure data provider.

The security gateway 490 is thus configured to determine 730 whether the external data request from the third party code is authorised to send the external data request comprising the secure data. If the external data request is authorised, it is transmitted 740 to the external data provider 150, otherwise it is blocked.

The security gateway 490 determines whether the external data request is trusted or not by looking up the external data provider destination, e.g. domain or IP address, against a database of permitted or non-permitted external data provider destinations maintained by the secure data provider 130 within the secure portion 100, or held at the secure data provider 130 itself. Permitted destinations within the external data request are allowed to be sent from the secure portion 100, whereas external data requests comprising non-permitted destinations are blocked. Moreover, the security gateway 490 can determine whether an external data request containing specific types of secure data or specific secure data should be sent to specific external data provider destinations. For example, the secure data provider 130 can additionally maintain a database comprising a lookup table which associates only certain specific secure data types as permitted data types for corresponding external data providers. Thus, one secure data type may be permitted for a first external data provider, but not permitted for a second external data provider. In this way, the third party cloud computing environment 100 of the present disclosure enables highly secure, but flexible, control over external data access, even when the executable code is provisioned by a third party user 140, but a proportion of the data is obtained from a secure data provider 130.

The external data provider 150 receives the request for data from the cloud 100 and then processes it to lookup data based on the content of the external data request to obtain the associated external data. For example, if the external data request comprises secure data which is the address of a customer known to secure data provider 130, and the external data provider 150 is a housing data provider, then the external data obtain may be property information associated with the property address of the customer.

It is advantageous to ensure that the secure data is not transmitted to external data providers that are not trusted by the secure data provider 130 since the computer code is provisioned by the third party user 140 within the third party cloud computing environment 100, and could otherwise be configured to leak secure data to unauthorised recipients or destinations without the knowledge or control of the secure data provider 130.

The external data which is then sent by the external data provider 150 can additionally be checked 760 by the security gateway 490 for authenticity or unsafe content before being permitted to enter the secure portion 100. The security gateway is located logically at the edge of the secure portion 100 such that it can filter all requests in and out of the secure portion 100, and moreover filter the external content arriving from the external data provider. This is to ensure that unsafe or malicious data is not then subsequently processed by the third party code, such that security of the secure portion is breached, for example the computer executable code might be modified by its processing of malicious content such that the secure data could be leaked via a back door out of the secure portion. The external data content is filtered in this way by determining its content type or specific content, and comparing this against a database of permitted or non-permitted data content types or content; this database is provisioned in the secure portion 100 by the secure data provider 130, or alternatively can be located at the secure data provider 130 itself. Permitted content or content types of external data area allowed to enter the secure portion 100 and be processed by the third party computer code, whereas non-permitted data content types or data content are blocked from entry into the secure data portion 100.

General

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention can take the form of an entirely hardware embodiment, an entirely software embodiment or an embodiment containing both hardware and software elements. In a preferred embodiment, the invention is implemented in software.

Furthermore, the invention can take the form of a computer program embodied as a computer-readable medium having computer executable code for use by or in connection with a computer. For the purposes of this description, a computer readable medium can be any tangible apparatus that can contain, store, communicate, propagate, or transport the program for use by or in connection with the computer. Moreover, a computer-readable medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-RAN) and DVD.

The flow diagrams in the drawings illustrate the architecture, functionality, and operation of possible implementations of methods according to various embodiments of the present invention. In this regard, each block in the flow diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the flow diagrams, and combinations of blocks in the flow diagrams, can be implemented by special purpose hardware-based systems that perform the specified functions or acts, or combinations of special purpose hardware and computer instructions.

It will be understood that the above description of is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

EMBODIMENTS

The following list provides embodiments of the invention and forms part of the description. These embodiments can be combined in any compatible combination beyond those expressly stated. The embodiments can also be combined with any compatible features described herein:

1. A method of securely processing data in a third-party cloud environment, the method comprising:
   a. providing, from a user to the third-party cloud environment, computer executable code configured to process protected data input into the third-party cloud environment, and storing the computer executable code in a secure portion of the third-party cloud environment which is under the control of a secure provider;
   b. providing, from the secure provider to the third-party cloud environment, protected data and storing the protected data within the secure portion;
   c. executing, in the secure portion, the computer executable code so as to process the protected data solely within the secure portion of the third-party cloud environment and generate output data; and
   d. restricting, via the secure portion, the user from retrieving output data from the secure portion of the third-party cloud environment.
2. The method of embodiment 1, wherein the step of restricting comprises preventing the user from accessing any of the output data from the secure portion of the third-party cloud environment.
3. The method of embodiment 2, wherein the step of restricting further comprises storing all of the output data to a secure bucket in the secure portion.
4. The method of embodiment 1, wherein the step of restricting comprises preventing the user from retrieving a protected subset of the output data from the secure portion, but enabling the user to access an unprotected subset of the output data.

5. The method of embodiment 4, wherein the step of restricting further comprises storing the protected subset to a secure bucket in the secure portion.
6. The method of embodiment 4 or 5, wherein the unprotected subset of the output data comprises only a summary of the output data.
7. The method of embodiment 4 or 5, wherein the unprotected subset of the output data comprises a visual report provided to the user.
8. The method of any of embodiments 4 to 7, wherein enabling the user to access the unprotected subset of the output data is performed via a first virtual desktop in the secure portion.
9. The method of embodiment 8, wherein the ability to copy files to the clipboard of the first virtual desktop is disabled.
10. The method of embodiment 8 or 9, wherein access to a communication network from the first virtual desktop is disabled.
11. The method of any of embodiments 8 to 10, wherein enabling the user to access the unprotected subset of the output data via a first virtual desktop is provisioned by a session manager.
12. The method of embodiment 11, further comprising time restricting user access to the first virtual desktop with the session manager.
13. The method of any of embodiments 8 to 12, further comprising providing the user with a private link for accessing the unprotected subset of the output data via the first virtual desktop.
14. The method of any of embodiments 8 to 13, wherein the first virtual desktop is hosted by an experimental build account in the secure portion.
15. The method of embodiment 14, wherein the experimental build account comprises a virtual private cloud.
16. The method of embodiment 15, further comprising preventing the user from accessing a communication network from the experimental build account by setting the virtual private cloud to private.
17. The method of embodiment 15, further comprising preventing the user from accessing a communication network from the experimental build account by a security gateway in the experimental build account.
18. The method of any of embodiments 14 to 17, further comprising authenticating the user in the experimental build account with multi-factor authentication.
19. The method of any of embodiments 14 to 18, further comprising time restricting user access to the experimental build account.
20. The method of embodiment 19, wherein access is only available to the user during a predetermined time period.
21. The method of embodiment 19 or 20, wherein access is only available to the user during predetermined times of the day and/or predetermined days of the week.
22. The method of any of embodiments 14 to 21, further comprising restricting user access to the experimental build account if the IP of the user is outside a predetermined IP range.
23. The method of any of embodiments 14 to 21, further comprising restricting user access to the experimental build account if the region of the user is outside a predetermined region.
24. The method of any preceding embodiment, wherein storing the computer executable code in the secure portion comprises storing the computer executable code within an experimental build account of the secure portion.
25. The method of embodiment 24, wherein the stored computer executable code is only accessible to the user via a first virtual desktop.
26. The method of any preceding embodiment, wherein the step of executing comprises modifying the computer executable code itself within the secure portion, and wherein the step of restricting the user from retrieving the computer executable code from the secure portion comprises preventing the user from obtaining the modified computer executable code.
27. The method of embodiment 26, wherein the step of modifying is performed by the user within an experimental build account of the secure portion.
28. The method of embodiment 27, wherein preventing the user from obtaining the modified computer executable code comprises disabling access to a communication network from the experimental build account.
29. The method of embodiment 26, wherein the step of modifying is performed by the user in a pipeline of the secure portion.
30. The method of embodiment 29, wherein the pipeline has a plurality of accounts, and wherein the step of modifying is performed in at least one of the accounts.
31. The method of embodiment 30, wherein preventing the user from obtaining the modified computer executable code comprises disabling access to a communication network from the at least one of the accounts in which the step of modifying is performed.
32. The method of any one of the preceding embodiments, wherein the step of providing protected data comprises receiving at the secure provider a request for protected data from the computer executable code in the secure portion of the third-party cloud environment.
33. The method of embodiment 32, wherein the request for protected data is a request to access to an API of secure provider.
34. The method of embodiment 32 or 33, further comprising, prior to the step of receiving, validating by a data security validation module provisioned by the secure provider within the secure portion, the request for protected data.
35. The method of embodiment 34, wherein the step of validating comprises modifying, by the data security validation module, the request prior to sending to the secure provider so as to remove any request for protected data being sent to the secure provider which has a level of restricted access above a certain threshold.
36. The method of embodiment 35, wherein the certain threshold is based where in the secure portion the protected data is being processed.
37. The method of embodiment 35 or 36, wherein the removed request for protected data is replaced by a request for pseudonymised data.
38. The method of any of embodiments 35 to 37, further comprising removing, by the secure provider, a subset of data of the protected data from being sent to the secure portion, wherein the removed subset of data has a level of restricted access above a certain threshold.
39. The method of embodiment 38, wherein the removed subset of the data is the cognitive content of the data and the remaining subset of the data is pseudonymised data.
40. The method of any of embodiments 32 to 39, wherein the step of executing comprises logging traffic data, and sending the data traffic logs to a monitoring service which reacts to changes in the request for protected data.
41. The method of any preceding embodiment, wherein storing the protected data within the secure portion comprises storing within an experimental build account of the secure portion.
42. The method of embodiment 41, wherein the stored protected data is only accessible to the secure provider via a second virtual desktop.
43. The method of any preceding embodiment, wherein the step of executing comprises processing the protected data within a pipeline of the secure portion.
44. A method of securely processing data in a third-party cloud environment, the method comprising:
a. providing, from a secure provider to the third-party cloud environment, protected computer executable code configured to process data input into the third-party cloud environment, and storing the protected computer executable code in a secure portion of the third-party cloud environment which is under the control of a secure provider;
b. providing, from a user to the third-party cloud environment, data and storing the data within the secure portion;
c. executing, in the secure portion, the protected computer executable code so as to process the data solely within the secure portion of the third-party cloud environment and generate output data; and
d. restricting, via the secure portion, the user from retrieving the output data from the secure portion of the third-party cloud environment.
45. The method of embodiment 44, wherein the step of restricting comprises preventing the user from accessing any of the output data from the secure portion of the third-party cloud environment.
46. The method of embodiment 44 or 45, wherein the step of restricting further comprises preventing the user from accessing the protected computer executable code from the secure portion of the third-party cloud environment.
47. The method of any of embodiments 44 to 46, wherein storing the protected computer executable code in the secure portion of the third-party cloud environment comprises storing the computer executable code within an experimental build account of the secure portion.
48. The method of embodiment 47, wherein the stored protected computer executable code is only accessible to the secure provider via a second virtual desktop.
49. The method of any of embodiments 44 to 48, wherein storing the data within the secure portion comprises storing within an experimental build account of the secure portion.
50. The method of embodiment 49, wherein stored data is accessible to the user via a first virtual desktop.
51. A secure portion for a cloud environment, the secure portion configured to perform the method of any preceding embodiment.
52. A cloud computing environment comprising the secure portion of any of embodiments 51.
53. Computer hardware configured to implement the method of any of embodiments 1 to 50, the secure portion of embodiment 51, or the cloud computing environment of embodiment 52.
54. A method of securely processing data in a third party cloud environment, the method comprising:

a. providing in a secure portion of the third party cloud environment which is under the control of a secure data provider, third party computer executable code from a third party user;
b. executing the third party computer executable code in the secure portion to request and receive from a secure data provider secure data of the secure data provider;
c. processing in a secure portion of the third party cloud environment, an external data request for external data to be received from an external data provider, the external data request comprising at least a portion of the secure data; and
d. determining by the third party cloud environment whether to authorise the external data request, and if the request is so authorised sending the request to the external data provider and receiving the external data from the external data provider.
55. The method of embodiment 54, further comprising executing, in the secure portion of the third party cloud environment, the computer executable code which is configured to generate an output dataset by processing some or all of the received secure data and/or the received external data.
56. The method of embodiment 55, further comprising:
a. determining by the third party cloud environment, whether the output dataset is authorised for retrieval from the secured portion of the third party cloud environment; and
b. if the output dataset is not authorised for retrieval, then preventing the output dataset from being retrieved from the third party cloud environment.
57. The method of embodiment 56, wherein the step of determining whether the output dataset is authorised for retrieval comprises determining whether the output dataset is authorised for retrieval by a further third party user.
58. The method of embodiment 56 or embodiment 57, wherein if the output dataset is authorised for retrieval, then outputting the output dataset to a further third party user
59. The method of any one of the preceding embodiments, wherein the step of determining whether to authorise the external data request is performed by a security gateway provisioned by the secure data provider within the secure portion of the third party cloud environment.
60. The method of any one of the preceding embodiments, wherein the step of determining whether to authorise the external data request comprises:
a. validating whether the portion of the secure data is trusted by the secure data provider for sending to the external data provider;
b. if the portion of the secure data is trusted by the secure data provider for sending to the external data provider, sending the external data request to the external data provider for retrieving from the external data provider into the secure portion the external data identified at least in part by the portion of the secure data, and storing, in the secure portion of the third party cloud environment, the received external data;
c. if the portion of the secure data is not trusted by the secure data provider, preventing the external data from being retrieved from the external data provider into the third party cloud environment.
61. The method of embodiment 60, wherein the step of validating whether the portion of the secure data is trusted by the secure data provider for sending to the external data provider comprises:

a. accessing a database located within the secure portion or located at the secure data provider comprising an authorised list of secure data types permitted for sending to the external data provider;
b. searching the database to determine whether the portion of the secure data is in the list of secure data types for the external data provider;
c. only if the portion of the secure data is in the list of secure data types, setting the external data provider as trusted.

62. The method of any one of the preceding embodiments, wherein the step of determining whether to authorise the external data comprises:
a. validating whether the external data provider is trusted by the secure data provider;
b. if the external data provider is trusted by the secure data provider, sending the external data request to the external data provider for retrieving from the external data provider into the secure portion the external data, and storing, in the secure portion of the third party cloud environment, the received external data;
c. if the external data provider is not trusted by the secure data provider, then preventing the external data from being retrieved from the external data provider into the third party cloud environment.

63. The method of embodiment 62, wherein the step of validating whether the external data provider is trusted by the secure data provider comprises:
a. accessing a database comprising a list of trusted external data providers;
b. searching the database to determine whether the external data provider is in the list of trusted external data providers;
c. only if the external data provider is in the list of trusted external data providers, then setting the external data provider as trusted.

64. The method of any one of the preceding embodiments, further comprising:
a. when the requested external data is received at the third party cloud environment from the external data provider, determining whether the received external data is authorised for reception into the secure portion of the third party cloud environment,
b. if the received external data is so authorised for reception into the secure portion, providing the received external data into the secure portion; and
c. if the received external data is not authorised for reception into the secure portion, preventing the received external data being received into the secure portion.

65. The method of embodiment 64, wherein the following steps are performed by a security gateway of third party cloud environment: determining whether the received external data is authorised for reception into the secure portion, providing the received external data into the secure portion; and preventing the received external data being received into the secure portion.

66. The method of embodiment 64 or embodiment 65, wherein the step of determining whether the received external data is authorised for reception into the secure portion of the third party cloud environment comprises:
a. accessing a database located within the secure portion or located at the secure data provider comprising an authorised list of data types and/or data content permitted for receiving into the secure portion;
b. searching the database to determine whether the received external data comprises data which is of a data type or comprises content which is in the authorised list;
c. only if the data type or content is in the authorised list, setting the received external data as authorised.

67. The method of any preceding embodiment, wherein providing the computer executable code in the secure portion comprises storing the computer executable code within an experimental build account of the secure portion.

68. The method of embodiment 67, wherein the stored computer executable code is only accessible to the user via a first virtual desktop.

69. The method of any preceding embodiment, wherein the step of executing comprises modifying the computer executable code itself within the secure portion, and wherein the step of restricting the user from retrieving the computer executable code from the secure portion comprises preventing the user from obtaining the modified computer executable code.

70. The method of embodiment 69, wherein the step of modifying is performed by the user within an experimental build account of the secure portion.

71. The method of embodiment 70, wherein preventing the user from obtaining the modified computer executable code comprises disabling access to a communication network from the experimental build account.

72. The method of embodiment 69, embodiment 70, or embodiment 71, wherein the step of modifying is performed by the user in a pipeline of the secure portion.

73. The method of embodiment 72, wherein the pipeline has a plurality of accounts, and wherein the step of modifying is performed in at least one of the accounts.

74. The method of embodiment 73, wherein preventing the user from obtaining the modified computer executable code comprises disabling access to a communication network from the at least one of the accounts in which the step of modifying is performed.

75. The method of any one of the preceding embodiments, wherein the secure data comprises protected data.

76. The method of embodiment 75, wherein the step of providing protected data comprises receiving at the secure provider a request for protected data from the computer executable code in the secure portion of the third-party cloud environment.

77. The method of embodiment 76, wherein the request for protected data is a request to access to an API of secure provider.

78. The method of any preceding embodiment, wherein storing the secure data within the secure portion comprises storing within an experimental build account of the secure portion.

79. The method of any preceding embodiment, wherein the step of executing comprises processing the secure data and/or external data within a pipeline of the secure portion.

80. A secure portion processing module for a cloud computing environment system, wherein the secure portion processing module is configured to perform the method of any one of the preceding embodiments.

81. A cloud computing environment system comprising the secure portion processing module of embodiment 80.

82. Computer hardware configured to implement the method of any of embodiments 54 to 79, the secure portion processing module of embodiment 80, or the cloud computing environment system of embodiment 81.

The invention claimed is:

1. A method of securely processing data in a third party cloud computing environment, the method comprising:
receiving computer executable code from a user of the third party cloud computing environment;
providing the computer executable code in a secure portion of the third party cloud computing environment, wherein the secure portion is controlled by a secure data provider independently of the user, and wherein the secure portion is hosted by cloud computing environment hardware on one or more servers of the third party cloud computing environment;
executing the computer executable code in the secure portion to request secure data from the secure data provider and to receive the secure data from the secure data provider;
further executing the computer executable code in the secure portion to generate an encrypted external data request that comprises at least a portion of the secure data;
determining, by the third party cloud computing environment, based on a data type of the portion of the secure data, whether an external data provider is authorised to receive the portion of the secure data;
in response to determining that the external data provider is authorised to receive the portion of the secure data, sending, by the third party cloud computing environment, the encrypted external data request to the external data provider;
receiving, in response to the encrypted external data request, external data from the external data provider at the third party cloud computing environments;
storing, in the secure portion of the third party cloud computing environment, the received external data; and
in response to determining that the external data provider is not authorised to receive the portion of the secure data, blocking the encrypted external data request from being transmitted to the external data provider,
wherein the user is different from a party that controls the third party cloud computing environment,
wherein the user is different from a party that controls the secure data provider, and
wherein the external data provider is different from the party that controls the secure data provider.

2. The method of claim 1, further comprising:
further executing the computer executable code in the secure portion to process some or all of the secure data and/or the external data and generate an output dataset.

3. The method of claim 2, further comprising:
further determining, by the third party cloud computing environment, that the output dataset is not authorised for retrieval from the secure portion; and
preventing the output dataset from being retrieved from the third party cloud computing environment.

4. The method of claim 3, wherein the step of further determining comprises determining that the output dataset is not authorised for retrieval by a further user.

5. The method of claim 2, further comprising:
further determining, by the third party cloud computing environment, that the output dataset is authorised for retrieval from the secure portion; and
outputting the output dataset to a further user.

6. The method of claim 1, wherein the step of determining is performed by a security gateway, wherein the security gateway is provisioned by the secure data provider within the secure portion.

7. The method of claim 1, wherein providing the computer executable code in the secure portion comprises storing the computer executable code within an experimental build account of the secure portion.

8. The method of claim 7, wherein the stored computer executable code is only accessible to the user via a first virtual desktop.

9. The method of claim 1, wherein the step of executing comprises modifying the computer executable code itself within the secure portion, and wherein the method further comprises a step of restricting the user from retrieving the computer executable code from the secure portion by preventing the user from obtaining the modified computer executable code.

10. The method of claim 9, wherein the step of modifying is performed by the user within an experimental build account of the secure portion.

11. The method of claim 10, wherein preventing the user from obtaining the modified computer executable code comprises disabling the user's network access to the experimental build account.

12. The method of claim 9, wherein the step of modifying is performed by the user in a pipeline of the secure portion.

13. The method of claim 12, wherein the pipeline has a plurality of accounts, and wherein the step of modifying is performed in at least one account of the plurality of accounts.

14. The method of claim 13, wherein preventing the user from obtaining the modified computer executable code comprises disabling the user's network access to the at least one account.

15. The method of claim 1, wherein the secure data comprises protected data.

16. The method of claim 15, wherein the step of executing the computer executable code in the secure portion to request secure data from the secure data provider comprises requesting the protected data from the secure data provider.

17. The method of claim 16, wherein the step of requesting the protected data comprises requesting access to an API of the secure data provider.

18. The method of claim 1, wherein the secure data is stored within an experimental build account of the secure portion.

19. The method of claim 1, further comprising processing the secure data and/or the external data within a pipeline of the secure portion.

20. A secure portion processing module hosted by cloud computing environment hardware on one or more servers of a third party cloud computing environment, the secure portion processing module configured to perform data processing steps comprising:
receiving computer executable code from a user of the third party cloud computing environment;
providing the computer executable code in a secure portion of the third party cloud computing environment, wherein the secure portion is controlled by a secure data provider independently of the user, and wherein the secure portion is hosted by cloud computing environment hardware on one or more servers of the third party cloud computing environment;

executing the computer executable code in the secure portion to request secure data from the secure data provider and to receive the secure data from the secure data provider;
further executing the computer executable code in the secure portion to generate an encrypted external data request that comprises at least a portion of the secure data;
determining, by the third party cloud computing environment, based on a data type of the portion of the secure data, whether an external data provider is authorised to receive the portion of the secure data;
in response to determining that the external data provider is authorised to receive the portion of the secure data, sending, by the third party cloud computing environment, the encrypted external data request to the external data provider;
receiving, in response to the encrypted external data request, external data from the external data provider at the third party cloud computing environments;
storing, in the secure portion of the third party cloud computing environment, the received external data; and
in response to determining that the external data provider is not authorised to receive the portion of the secure data, blocking the encrypted external data request from being transmitted to the external data provider,
wherein the user is different from a party that controls the third party cloud computing environment,
wherein the user is different from a party that controls the secure data provider, and
wherein the external data provider is different from the party that controls the secure data provider.

21. A system for securely processing data in a third-party cloud computing environment, the system comprising:
at least one computer processor configured to:
receive computer executable code from a user of the third party cloud computing environment;
provide the computer executable code in a secure portion of the third party cloud computing environment, wherein the secure portion is controlled by a secure data provider independently of the user, and wherein the secure portion is hosted by cloud computing environment hardware on one or more servers of the third party cloud computing environment;
execute the computer executable code in the secure portion to request secure data from the secure data provider and to receive the secure data from the secure data provider;
further execute the computer executable code in the secure portion to generate an encrypted external data request that comprises at least a portion of the secure data;
determine, by the third party cloud computing environment, based on a data type of the portion of the secure data, whether an external data provider is authorised to receive the portion of the secure data;
in response to determining that the external data provider is authorised to receive the portion of the secure data, send, by the third party cloud computing environment, the encrypted external data request to the external data provider;
receive, in response to the encrypted external data request, external data from the external data provider at the third party cloud computing environments;
store, in the secure portion of the third party cloud computing environment, the received external data; and
in response to determining that the external data provider is not authorised to receive the portion of the secure data, block the encrypted external data request from being transmitted to the external data provider,
wherein the user is different from a party that controls the third party cloud computing environment,
wherein the user is different from a party that controls the secure data provider, and
wherein the external data provider is different from the party that controls the secure data provider.

22. A non-transitory computer readable medium storing instructions that, when executed by one or more computer processors in a third-party cloud computing environment, cause the one or more computer processors to:
receive computer executable code from a user of the third party cloud computing environment;
provide the computer executable code in a secure portion of the third party cloud computing environment, wherein the secure portion is controlled by a secure data provider independently of the user, and wherein the secure portion is hosted by cloud computing environment hardware on one or more servers of the third party cloud computing environment;
execute the computer executable code in the secure portion to request secure data from the secure data provider and to receive the secure data from the secure data provider;
further execute the computer executable code in the secure portion to generate an encrypted external data request that comprises at least a portion of the secure data;
determine, by the third party cloud computing environment, based on a data type of the portion of the secure data, whether an external data provider is authorised to receive the portion of the secure data;
in response to determining that the external data provider is authorised to receive the portion of the secure data, send, by the third party cloud computing environment, the encrypted external data request to the external data provider;
receive, in response to the encrypted external data request, external data from the external data provider at the third party cloud computing environment;
store, in the secure portion of the third party cloud computing environment, the received external data; and
in response to determining that the external data provider is not authorised to receive the portion of the secure data, block the encrypted external data request from being transmitted to the external data provider,
wherein the user is different from a party that controls the third party cloud computing environment,
wherein the user is different from a party that controls the secure data provider, and
wherein the external data provider is different from the party that controls the secure data provider.

23. The non-transitory computer readable medium of claim 22, wherein causing the one or more processors to determine comprises causing the one or more processors to:
validate whether the portion of the secure data is trusted by the secure data provider for sending to the external data provider;
if the portion of the secure data is trusted by the secure data provider for sending to the external data provider, send the encrypted external data request to the external data provider for retrieving from the external data provider into the secure portion the external data identified at least in part by the portion of the secure data, and store, in the secure portion, the received external data; and if the portion of the secure data is not trusted by the secure data provider, prevent the external data from being retrieved from the external data provider into the third party cloud environment.

24. The non-transitory computer readable medium of claim 23, wherein causing the one or more processors to validate comprises causing the one or more processors to:

access a database located within the secure portion or located at the secure data provider, wherein the database comprises an authorised list of secure data types permitted for sending to the external data provider;

search the database to determine that the portion of the secure data is in the list of secure data types for the external data provider; and set the external data provider as trusted.

25. The non-transitory computer readable medium of claim 22, wherein causing the one or more processors to determine comprises causing the one or more processors to:

validate whether the external data provider is trusted by the secure data provider;

if the external data provider is trusted by the secure data provider, send the encrypted external data request to the external data provider for retrieving from the external data provider into the secure portion the external data, and store, in the secure portion, the received external data; and if the external data provider is not trusted by the secure data provider, then prevent the external data from being retrieved from the external data provider into the third party cloud environment.

26. The non-transitory computer readable medium of claim 25, wherein causing the one or more processors to validate comprises causing the one or more processors to:

access a database comprising a list of trusted external data providers;

search the database to determine that the external data provider is in the list of trusted external data providers; and set the external data provider as trusted.

27. The non-transitory computer readable medium of claim 22, wherein the non-transitory computer readable medium stores further instructions that, when executed by one or more computer processors in the third-party cloud computing environment, cause the one or more computer processors to:

when the requested external data is received at the third party cloud computing environment from the external data provider, determine whether the received external data is authorised for reception into the secure portion;

if the received external data is so authorised for reception into the secure portion, provide the received external data into the secure portion; and if the received external data is not authorised for reception into the secure portion, prevent the received external data from being received into the secure portion.

28. The non-transitory computer readable medium of claim 27, wherein the non-transitory computer readable medium stores further instructions for a security gateway of the third party cloud computing environment that, when executed by one or more computer processors in a third-party cloud computing environment, cause the one or more computer processors to:

determine whether the received external data is authorised for reception into the secure portion;

if the received external data is so authorised for reception into the secure portion, provide the received external data to the secure portion; and if the received external data is not authorised for reception into the secure portion, prevent the received external data from being received into the secure portion.

29. The non-transitory computer readable medium of claim 27, wherein causing the one or more processors to determine comprises causing the one or more processors to:

access a database located within the secure portion or located at the secure data provider, wherein the database comprises an authorised list of data types and/or data content permitted for receiving into the secure portion;

search the database to determine that the received external data comprises data which is of a data type or comprises content which is in the authorised list; and set the received external data as authorised.

* * * * *